US012530398B2

(12) United States Patent
Kharbanda et al.

(10) Patent No.: US 12,530,398 B2
(45) Date of Patent: Jan. 20, 2026

(54) VISUAL CITATIONS FOR INFORMATION PROVIDED IN RESPONSE TO MULTIMODAL QUERIES

(71) Applicant: Google LLC, Mountain View, CA (US)

(72) Inventors: Harshit Kharbanda, Pleasanton, CA (US); Jessica Lee, Brooklyn, NY (US); Christopher James Kelley, Orinda, CA (US); Belinda Luna Zeng, Cupertino, CA (US); Louis Wang, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/314,646

(22) Filed: May 9, 2023

(65) Prior Publication Data

US 2024/0378236 A1 Nov. 14, 2024

(51) Int. Cl.
*G06F 16/538* (2019.01)
*G06F 16/583* (2019.01)

(52) U.S. Cl.
CPC ........ *G06F 16/538* (2019.01); *G06F 16/5846* (2019.01)

(58) Field of Classification Search
CPC .................... G06F 16/538; G06F 16/5846
See application file for complete search history.

(56) References Cited

U.S. PATENT DOCUMENTS

| | | | |
|---|---|---|---|
| 8,782,077 B1* | 7/2014 | Rowley | G06F 16/951 707/769 |
| 12,175,758 B2 | 12/2024 | Hosoya et al. | |
| 2010/0312734 A1* | 12/2010 | Widrow | G06F 18/2135 706/25 |
| 2015/0120440 A1* | 4/2015 | Jung | G06Q 30/0253 705/14.51 |
| 2016/0330150 A1* | 11/2016 | Joe | G06F 3/0486 |
| 2018/0108066 A1* | 4/2018 | Kale | G06F 16/24522 |
| 2018/0121768 A1 | 5/2018 | Lin et al. | |
| 2019/0361983 A1 | 11/2019 | Wang et al. | |
| 2020/0311798 A1* | 10/2020 | Forsyth | G06Q 30/0643 |
| 2021/0064612 A1* | 3/2021 | Huang | G06F 3/04815 |
| 2021/0273892 A1* | 9/2021 | Rakshit | G06F 16/953 |
| 2021/0303646 A1* | 9/2021 | Guntipalli | H04L 9/0897 |
| 2022/0292543 A1* | 9/2022 | Henderson | G06Q 30/0252 |
| 2022/0335585 A1 | 10/2022 | Spivak et al. | |
| 2023/0161808 A1* | 5/2023 | Bursztyn | G06F 16/53 707/772 |

(Continued)

FOREIGN PATENT DOCUMENTS

JP 2020144674 5/2020

*Primary Examiner* — Angelica Ruiz
(74) *Attorney, Agent, or Firm* — DORITY & MANNING P.A.

(57) ABSTRACT

A result image is retrieved based on a similarity between a query image and the result image. A first unit of text is obtained, wherein the first unit of text comprises at least a portion of textual content of a source document that includes the result image. A second unit of text is determined responsive to a prompt associated with the query image, wherein the second unit of text comprises one or more of (a) at least some of the first unit of text, or (b) text derived from the first unit of text. The second unit of text and the result image are provided for display within an interface.

20 Claims, 15 Drawing Sheets

(56) References Cited

U.S. PATENT DOCUMENTS

2023/0298224 A1\* 9/2023 Aggarwal ........... G06F 16/5838
                                                                 382/162
2023/0350936 A1\* 11/2023 Alayrac ................ G06N 3/045
2024/0202796 A1\* 6/2024 Sadr ................... G06Q 30/0621

\* cited by examiner

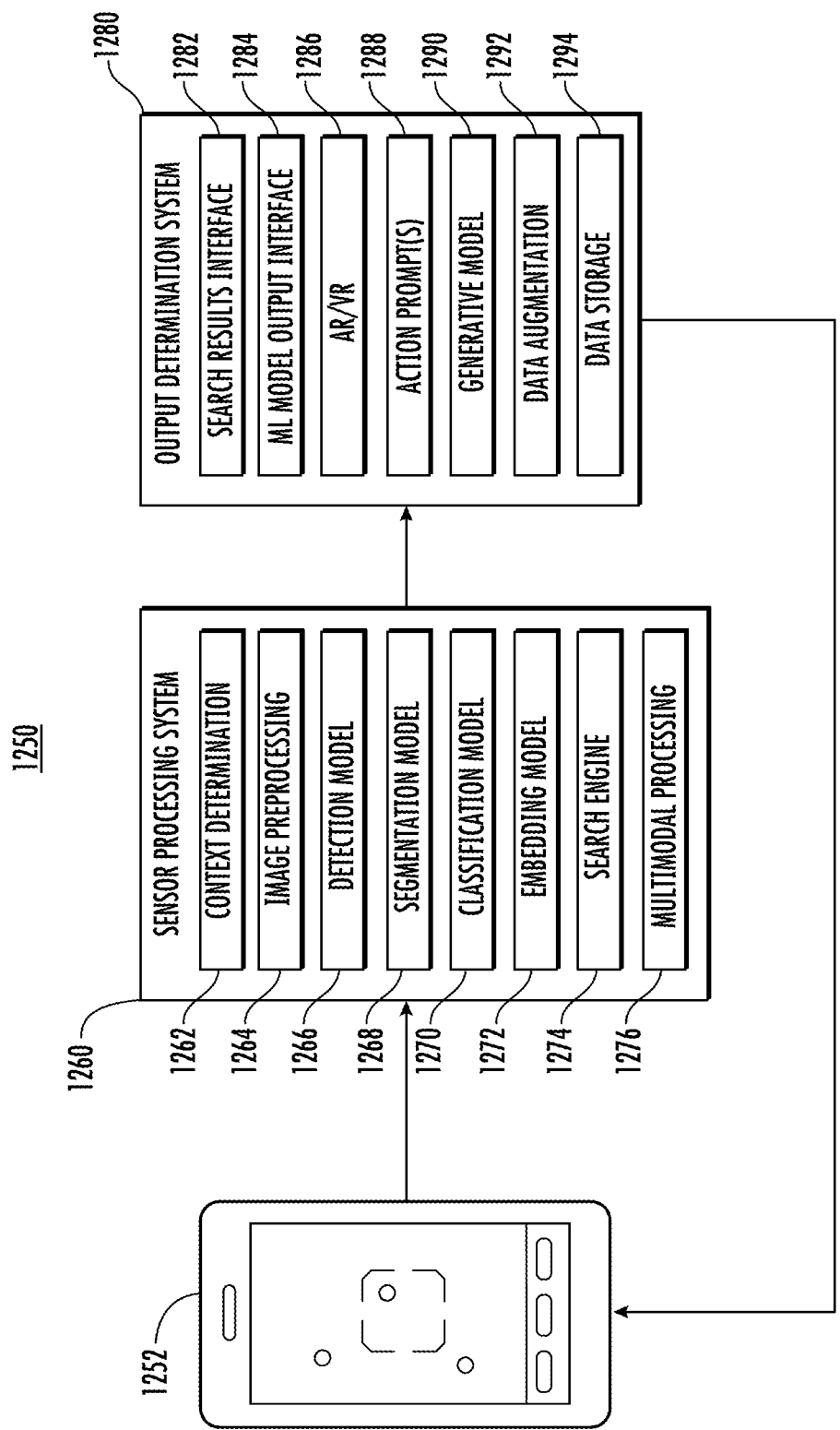

VISUAL CITATIONS FOR INFORMATION PROVIDED IN RESPONSE TO MULTIMODAL QUERIES

FIELD

The present disclosure relates generally to providing and presenting information for multimodal queries. More particularly, the present disclosure relates to generating visual citations for information retrieved, or derived, in response to multimodal queries.

BACKGROUND

Although text-based search services are ubiquitous in the modern world, users often struggle to formulate text-based queries in various circumstances. For example, users often find it difficult to describe an object with which they are unfamiliar. For another example, users are sometimes unable to properly express intent via text (e.g., an intended subject of a query, etc.). Multimodal queries have been proposed to facilitate more efficient and accurate interactions between users and search services. A multimodal query is a query formulated using multiple types, or formats, of data (e.g., textual content, audio data, video data, image data, etc.). For example, a user may provide a multimodal query to a search service that includes an image and an associated textual prompt (e.g., an image of a bird and a textual query of "what kind of bird is this?"). The search service can utilize various multimodal query processing techniques to retrieve search results, such as images and associated textual content, and can be presented to the user in a manner that indicates certain portions of textual content as being associated with particular result images.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The computer-implemented method includes retrieving, by a computing system comprising one or more processor devices, a result image based on a similarity between a query image and the result image. The computer-implemented method includes obtaining, by the computing system, a first unit of text, wherein the first unit of text comprises at least a portion of textual content of a source document that includes the result image. The computer-implemented method includes determining, by the computing system, a second unit of text responsive to a prompt associated with the query image, wherein the second unit of text comprises one or more of (a) at least some of the first unit of text, or (b) text derived from the first unit of text. The computer-implemented method includes providing, by the computing system, the second unit of text and the result image for display within an interface.

Another example aspect of the present disclosure is directed to a computing system. The computing system includes one or more processors. The computing system includes one or more non-transitory computer-readable media that collectively store a first set of instructions that, when executed by the one or more processors, cause the computing system to perform operations. The operations include obtaining a query image and an associated prompt from a user computing device. The operations include processing the query image with a machine-learned embedding model to obtain a query image embedding. The operations include retrieving a result image based on a similarity between the query image embedding and an embedding of the result image. The operations include identifying a source document for the result image, wherein the source document comprises the result image and textual content associated with the result image. The operations include determining a first unit of text comprising at least a portion of the textual content associated with the result image from the source document. The operations include processing the first unit of text and the prompt with a machine-learned language model to obtain a language output comprising a second unit of text, wherein the second unit of text comprises one or more of (a) at least some of the first unit of text, or (b) text derived from the first unit of text. The operations include providing the second unit of text and the result image for display within an interface of an application executed by the user computing device.

Another example aspect of the present disclosure is directed to one or more non-transitory computer-readable media that collectively store a first set of instructions that, when executed by one or more processors of a computing system, cause the computing system to perform operations. The operations include retrieving a plurality of result images based on a similarity between an intermediate representation of a query image and each of a plurality of intermediate representations respectively associated with the plurality of result images. The operations include identifying a plurality of source documents, wherein each of the plurality of source documents comprises a result image of the plurality of result images and textual content associated with the result image. The operations include respectively determining a plurality of first units of text for the plurality of result images, wherein each first unit of text comprises at least a portion of the textual content associated with the result image from one or more source documents that include the result image. The operations include processing a set of textual inputs with a machine-learned language model to obtain a language output comprising a second unit of text, wherein the set of textual inputs comprises (a) two or more first units of text respectively associated with two or more result images of the plurality of result images, and (b) a prompt associated with the query image. The operations include providing the second unit of text and the two or more result images to a user computing device for display within an interface of the user computing device.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 11B depicts a block diagram of an example computing system that performs visual search operations, and/or refinement of visual search information according to some implementations of the present disclosure.

Figure 1:
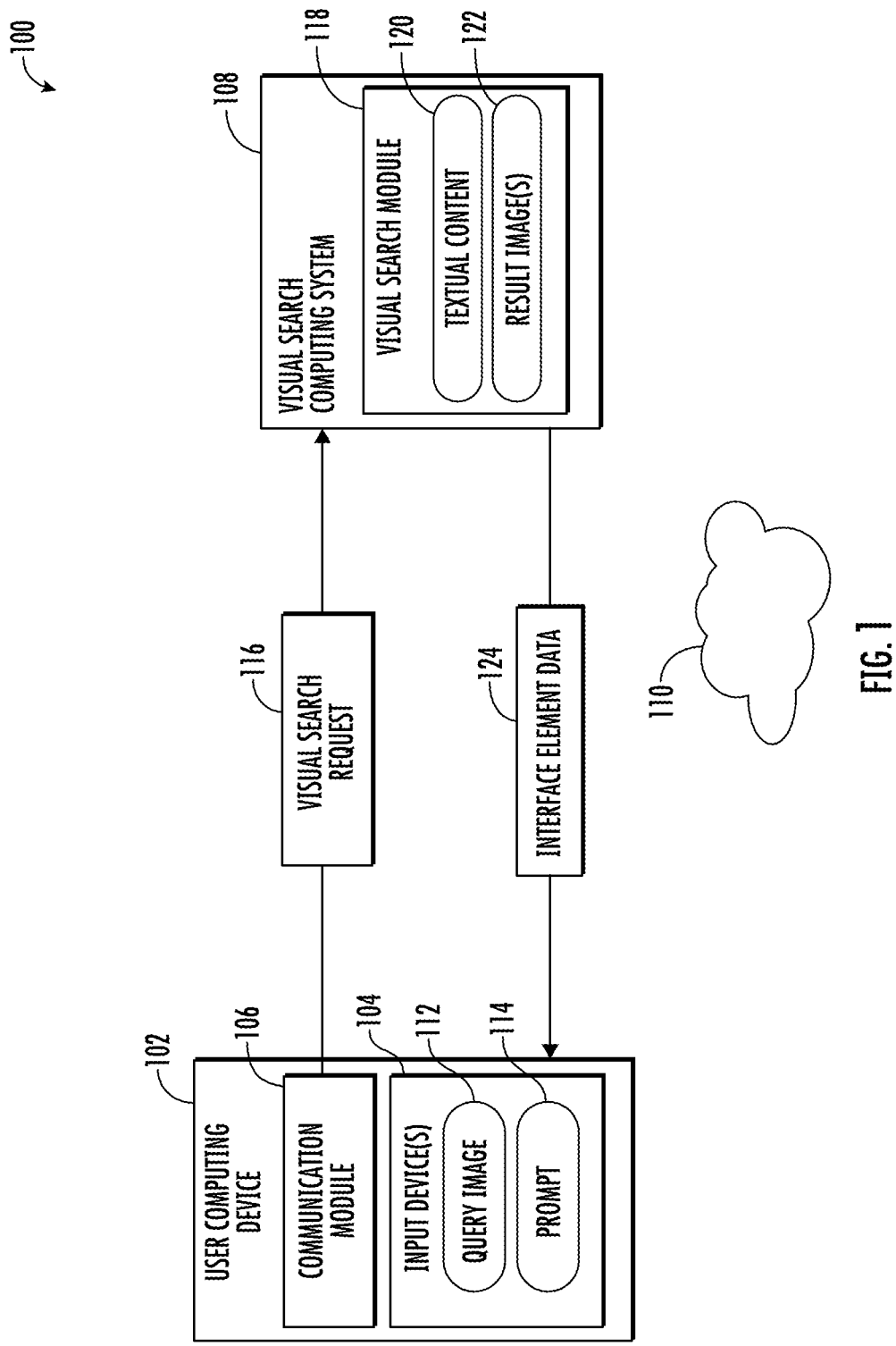
FIG. 1 depicts a block diagram of an example visual search system according to some implementations of the present disclosure.

Reference numerals that are repeated across plural figures are intended to identify the same features in various implementations.

DETAILED DESCRIPTION

Generally, the present disclosure is directed to presenting information to users retrieved in response to multimodal queries. More particularly, the present disclosure relates to generating visual citations that visually identify the sources of information provided retrieved in response to queries, such as visual queries or multimodal queries. A multimodal query is a query formulated using multiple types of data (e.g., textual content, audio data, video data, image data, etc.). In response to a multimodal query, a search system can retrieve and/or derive information using various multimodal query processing techniques.

As an example, assume that a user provides a multimodal query consisting of a query image of a bird and a corresponding prompt, such as "What bird is this?". A visual search system can retrieve result images that are visually similar to the query image. Based on the assumption that the source of a visually similar result image (e.g., a document that includes the image and textual content) is likely to include information relevant to the query image, the visual search system can extract information from the sources of the result images. The visual search system can then derive textual content from the extracted information based on the prompt (e.g., a summarization of the information, etc.). For example, the visual search system may process the textual content and the prompt with a machine-learned language model to generate a language output that includes the textual content.

The visual search system can provide the textual content and the visually similar images for display to the user in an interface of the user computing device. The interface can include attribution elements for the result images. An attribution element can include a representation of a result image (e.g., a thumbnail) and information that identifies the source of the image. To follow the previous example, if one result image depicts the same species of bird as depicted by the query image, and the source of the result image is a website, the attribution element can include a thumbnail of the result image and information that identifies the website (e.g., a title of the website, a URL, etc.). In such fashion, the user can quickly verify the accuracy of the textual content based on the visual similarity between the result images and the query image, or by navigating to the source of the result image. For example, if the result image depicts a bird that is clearly not the same species as the bird depicted by the query image, the user can quickly determine that it is relatively likely the corresponding textual content provided to the user is inaccurate.

In some implementations, the user can select an attribution element to indicate that a corresponding result image is inaccurate, and as such, that any information derived from the source of the result image is likely to be inaccurate. Based on the user's selection, the visual search system can derive textual content. To follow the previous example, the visual search system can retrieve four result images each depicting birds. The visual search system can extract information from the sources of the four result images, and can process the extracted information alongside the prompt provided by the user with a machine-learned language model to obtain a language output that includes textual content. The visual search system can provide the textual content and four attribution elements to a user computing device associated with the user.

For example, assume that one of the four result images depicts a bird that is clearly a different species than the birds depicted in the query image and the other three result images. The user can select the attribution element that includes that result image (e.g., via a touchscreen device, etc.), and the user computing device can indicate selection of the result image to the visual search system. Previously, the visual search system may have generated the textual content provided to the user by processing the prompt and a corpus of information extracted from the sources of the four result images with a machine-learned language model. As such, in response to selection of the result image, the visual search system can remove any information extracted from the source of the result image from the corpus of information, and can then process the remaining information with the machine-learned language model to generate a second language output including different textual content. This textual content can be provided to the user computing device. In such fashion, the visual search system can iteratively enhance results based on user feedback for visual citations.

Aspects of the present disclosure provide a number of technical effects and benefits. As one example technical effect and benefit, a search service that can provide direct answers to queries is much more desirable to users than a service that merely provides lists of related documents, as a list of documents still requires the user to expend substantial time and energy conducting further research. However, most search services capable of providing answers to user queries do not provide users with the ability to verify the accuracy of answers. Without the ability to verify answers, many users may decline to use such search services.

However, implementations of the present disclosure allow for the provision of visual citations to quickly and efficiently indicate the accuracy of an answer to a user. More specifically, by deriving responses to queries from information associated with result images that are visually similar to a query image, a user can quickly determine the accuracy of a response based on what is depicted in the result images. In such fashion, implementations of the present disclosure can provide responses to queries while also providing the ability for a user to quickly verify the accuracy of the responses.

It should be noted that, as described herein, "unit of text", "textual content", and "text" may be used interchangeably. Generally, each of the aforementioned terms can refer to a unit of one or more alphanumeric characters. For example, textual content, unit(s) of text, and text can refer to a discrete paragraph, a single word, a single number, a string of alphanumeric characters, line(s) of programmatic code or instructions, machine language, machine-readable codes, etc.

Additionally, it should be noted that any text, textual content, and/or unit of text referred to herein may be derived from audio data, image data, audiovisual data, etc. For example, a "document," which will be defined further in the specification, may be a news article that has been scanned and saved as images. Text can be extracted from such images using conventional optical character recognition techniques. As such, images that depict text may be referred to as text, even if an intermediary processing technique is utilized to extract the text from the images. This is also applicable to audio and audiovisual mediums, such as recordings of conversations, videos, podcasts, music, videogames with dialogue, etc. More generally, those skilled in the art will appreciate that spoken utterances, depictions of text, or any other medium from which text can be derived may generally be referred to as "text" throughout the subject specification.

With reference now to the Figures, example embodiments of the present disclosure will be discussed in further detail.

FIG. 1 depicts a block diagram of an example visual search system 100 according to some implementations of the present disclosure. More specifically, a user computing device 102 can include input device(s) 104 and a communication module 106. The input device(s) 104 can be, or otherwise include, devices that can directly or indirectly receive an input from a user (e.g., a microphone, camera, touchscreen, physical button, infrared camera, mouse, keyboard, etc.) The communication module 106 can be, or otherwise include, hardware and/or software collectively configured to communicate with a visual search computing system 108 via network(s) 110. For example, the communication module 106 can include devices that facilitate a wireless connection to a network.

The user computing device 102 can obtain a query image 112 and an associated prompt 114. The query image 112 can be an image selected to serve as a query to the visual search computing system 108. For example, a user of the user computing device 102 can capture the query image 112 using input device(s) 104 of the user computing device 102. Alternatively, the user may obtain the query image 112 in some other manner (e.g., performing a screen capture, downloading the image, creating the image via image creation tools, etc.).

The prompt 114 associated with the query image 112 can include textual content provided by the user. For example, the user can directly prompt the textual content of the prompt 114 via a keyboard or some other input method included in the input device(s) 104. Alternatively, the user can indirectly provide the prompt 114. For example, the user can produce a spoken utterance, and the user computing device 102 can capture the spoken utterance with the input device(s) 104. The user computing device 102 can process the spoken utterance utilizing speech recognition technique(s) (e.g., a machine-learned text-to-speech model, etc.) to generate the prompt 114.

In some implementations, the query image 112 is provided without a corresponding prompt 114, the user computing device 102 can determine a likely prompt associated with the query image 112. For example, if the query image 112 depicts a bird as the main subject of interest in the image, the user computing device 102 can select a likely prompt 114 to provide alongside the query image 112 (e.g., "identify this object", "explain this", "tell me more", etc.). Alternatively, in some implementations, the user computing device 102 can modify a prompt 114 provided by the user of the user computing device 102. For example, the user computing device 102 may modify the prompt 114 to add contextual information to the prompt (e.g., time of day, geolocation, user information, information descriptive of prior query images and/or prompts provided by the user, etc.).

The user computing device 102 can provide a visual search request 116 to the visual search computing system 108 via the network(s) 110. The visual search request 116 can include the query image 112 and the prompt 114.

The visual search computing system 108 can include a visual search module 118. The visual search module 118 can process the visual search request 116 to obtain textual content 120 and result images 122. The textual content 120 can be responsive to the prompt 114 and the query image 112. For example, if the query image 112 depicts an animal, and the prompt 114 is "what is this animal," the textual content 120 can provide an answer to the prompt (e.g., identifying a species of the animal, or if a known animal, a name for the animal). The result images 122 can be images that are visually similar to the query image 112. These result images 122 are included in documents from which the textual content 120 was derived. The visual search module 118 can extract at least a portion of the text included in one or more of the documents. In some implementations, the visual search module 118 may perform various processing techniques to identify portions of text within a document that are likely to be relevant to the result image included in the document.

More specifically, the visual search module 118 can retrieve result images 122 based on a similarity between the query image 112 and the result images 122. For example, the visual search module 118 can include a machine-learned model that can be used to identify images that are visually similar to query image 112. The visual search module 118 can obtain text from documents that include the result images. A document, as described herein, can be any type or manner of source material that includes a result image, such as a website, academic journal, book, newspaper, article, social media post, transcript, blog, etc. In some implementations, the visual search module 118 can select the textual content 120 from the text extracted from the documents. Additionally, or alternatively, in some implementations, the visual search module 118 can derive the textual content 120 from the text extracted from the documents. For example, the visual search module 118 can include or otherwise access a machine-learned model, such as a large language model, and can process the text extracted from the documents and the prompt to obtain textual content 120.

The visual search module 118 can provide interface data 234 to the user computing device 102 via the network(s) 110. The interface data 124 can include the textual content 120 and the result images 122. For example, the interface data 124 may include instructions to highlight the textual content 120 and to include thumbnail representations of the result images 122 so that a user of the user computing device 102 can easily verify the accuracy of the result images 122, and correspondingly, the accuracy of the textual content 120. In such fashion, the visual search computing system 108 can provide responses to queries while facilitating quick and accurate verification of the answer by users.

Figure 2:
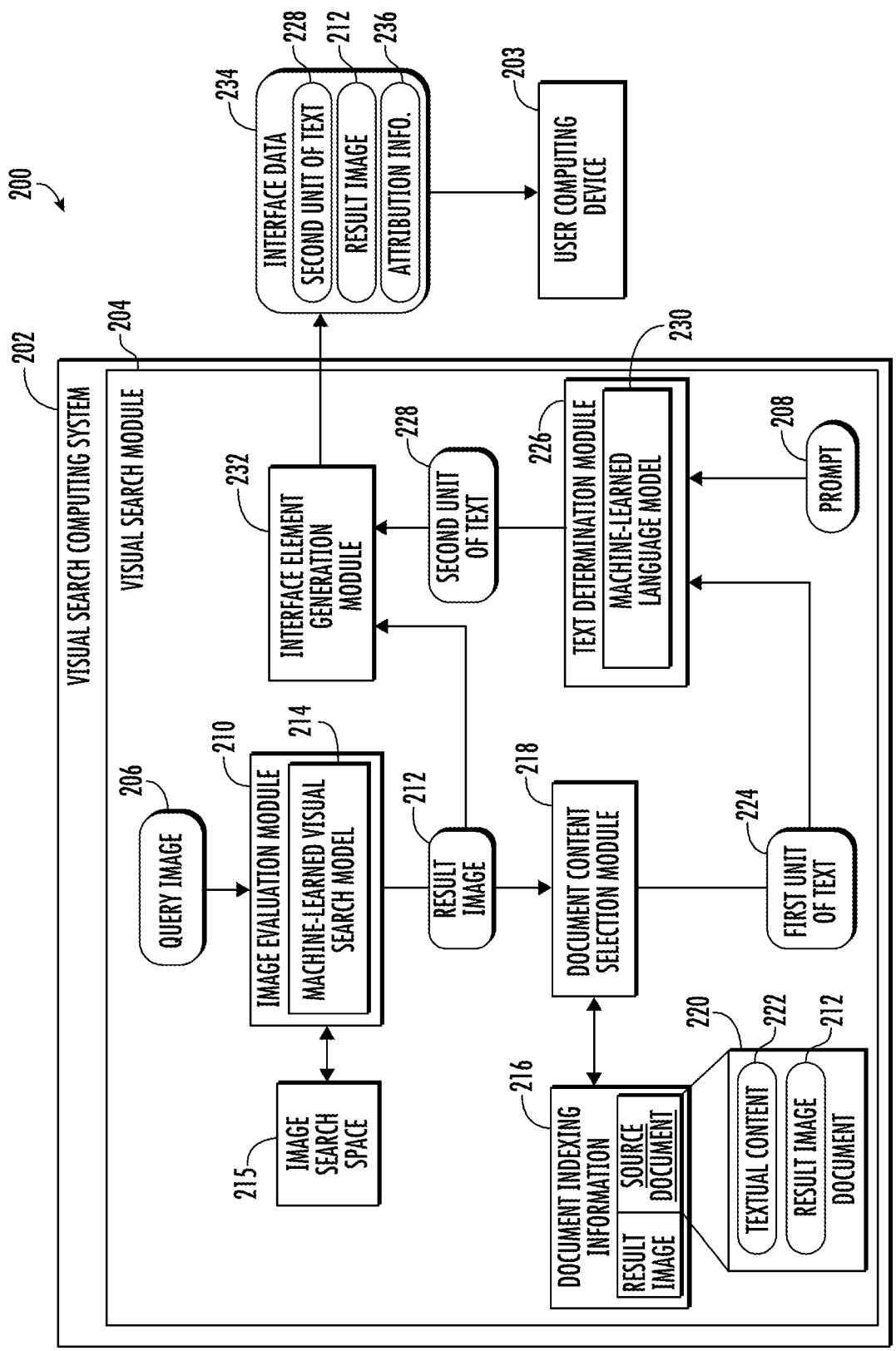
FIG. 2 depicts a data flow diagram for providing information and accompanying visual citations in response to visual queries according to some implementations of the present disclosure.

FIG. 2 depicts a data flow diagram 200 for providing information and accompanying visual citations in response to visual queries according to some implementations of the present disclosure. More specifically, a visual search computing system 202 (e.g., a physical server computing system, a cloud computing system, a virtualized and/or physical compute node in a network (e.g., an edge compute node, etc.) can include a visual search module can obtain a query image 206 and a prompt 208 from a user computing device. For example, a user computing device 203 can provide a visual search request to the visual search computing system 202 via a network.

In some implementations, the query image 206 can be received from the visual search computing system 202 without an associated prompt. In such circumstances, the visual search module 204 may determine to generate a prompt that is likely to be associated with the query image 206. For example, the visual search module 204 may include a machine-learned semantic image model trained to generate a semantic description of the query image 206. In some implementations, the visual search module 204 can utilize the semantic description of the query image 206 as the prompt 208. Alternatively, in some implementations, the visual search module 204 can process the semantic description of the query image 206 with another machine-learned model, such as a large language model, to generate the prompt 208.

In some implementations, the visual search module 204 may modify a prompt 208 received from the user computing device 203. For example, the visual search module 204 may modify the prompt 208 to add contextual information to the prompt (e.g., a time of day, geolocation of the user computing device 203, stored user information associated with a user of the user computing device 203, information descriptive of prior query images and/or prompts provided by the user computing device 203, etc.).

The visual search module 204 can include an image evaluation module 210. The image evaluation module 210 can perform various processing techniques to identify result images 212 that are visually similar to the query image 206. For example, the image evaluation module 210 can include a machine-learned visual search model 214 that is trained to identify images that are visually similar to the query image 206 from a corpus of stored image data. For example, in some implementations, the visual search model 214 can be a machine-learned encoding model, such as an embedding model, that can be used to generate an intermediate representation of the query image 206 (e.g., an embedding, etc.). The image evaluation module 210 can include, or can access, an image search space 215. The image search space 215 can include intermediate representations for a plurality of stored images. For example, the image search space 215 can be an embedding space that includes embeddings generated for images stored in a data store (e.g., a database, etc.) that stores and indexes a large volume of images to facilitate visual search services. The image evaluation module 210 can select result images 212 with embeddings closest to the embedding generated for the query image 206 within the embedding space.

It should be noted that the current example illustrates a single result image 212 merely to more clearly illustrate example implementations of the present disclosure. However, such implementations are not limited to obtaining a single result image 212. Rather, the result image 212 can be any number of result images obtained due to a similarity between the result images and the query image 206.

As described previously, the visual search module 204 can index a large volume of images to facilitate visual search services. The visual search module 204 can also index information that indicates source documents that include, or are otherwise associated with, the result images in document indexing information 216. A document, as described herein, can be any type or manner of source material that includes a result image, such as a website, academic journal, book, newspaper, article, social media post, transcript, blog, etc. A result image can be "associated" with a document if the result image was generated, created, hosted, etc. by the same entity as the document. For example, the document. For example, a result image can be associated with a document if the result image is used as cover art for the document, is derived from the document (e.g., an output of a generative model, etc.), is a frame of a video that the document was transcribed from, etc. A result image can be "included" in a document if the result image is currently located within the document, or was located within the document when the result image and/or the document was indexed.

The result image 212 can be included in a document 220. The document 220 can include the result image 212 and textual content 222. In some implementations, the document indexing information 216 can include a document 220 that includes, or is otherwise associated with, the result image 212, or can include textual content extracted from the document 220. Additionally, or alternatively, in some implementations, the document indexing information 216 can describe a source location of the document 220 (e.g., a file location within a network, a website URL, an FTP address, etc.). Additionally, or alternatively, in some implementations, the document indexing information 216 can include a compressed version of the document 220.

As described with regards to the result image 212, the current example illustrates a single document 220 merely to more clearly illustrate example implementations of the present disclosure. However, such implementations are not limited to obtaining a single document 220. Rather, in some implementations, a plurality of documents 220 can include a respective plurality of result images 212 (e.g., five documents for five result images). Additionally, or alternatively, in some implementations, a single document 220 can include multiple result images 212. Additionally, or alternatively, in some implementations, multiple documents 220 can each include an instance of a single result image 212.

As a specific example, assume that the query image 206 depicts a speed boat, and that the image evaluation module 210 selects a result image 212 which depicts the same speed boat from a different angle. If the selected result image 212 is hosted, or was originally hosted, at a website for speed boat enthusiasts (i.e., a document), the visual search module 204 may store a link to the website, an archived version of the website, or textual content extracted from the website within the document indexing information 216. More generally, the visual search module 204 can store information indicating an association between a document and a corresponding result image in the document indexing information 216.

The visual search module 204 can include a document content selection module 218. The document content selection module 218 can retrieve the document 220 that includes the result image 212. Once the document 220 is retrieved, the document content selection module 218 can extract a first unit of text 224 from the textual content 222 of the document 220. The first unit of text 224 can include some, or all, of the textual content 222 of the document 220. In some implementations, the document content selection module 218 may perform various processing techniques to identify portions of text within the text 224 that are likely to be relevant to the result image 212 included in the document 220. For example, if the document 220 is an online article, and the result image 212 is located halfway through the online article, the document content selection module 218 may heuristically select text (e.g., paragraphs, numbers of sentences or words, columns, etc.) located before and after the result image for inclusion in the first unit of text 224. Alternatively, in some implementations, the document content selection module 218 can extract all text included in the document for inclusion in the first unit of text 224.

The visual search module 204 can include a text determination module 226. The text determination module 226 can determine a second unit of text 228 based on the first unit of text 224 and the prompt 208. In some implementations, the text determination module 226 can determine the second unit of text 228 using a machine-learned language model 230. For example, the text determination module 226 can process the first unit of text 224 and the prompt 208 to obtain the second unit of text 228. In some implementations, the machine-learned language model 230 can be a large language model trained on a large corpus of training data to perform multiple generative tasks. Additionally, in some implementations, the machine-learned language model 230 may have undergone additional training iterations to tune, or optimize, the model for specific performance of language tasks relating to generation of the second unit of text 228.

The visual search module 204 can include an interface data generation module 232. The interface data generation module 232 can generate interface data 234, and can transmit the interface data 234 to the user computing device 203. The interface data 234 can include the second unit of text 228 and the result image 212. The interface data 234 can indicate a manner in which the second unit of text 228 and the result image 212 are to be displayed within an interface of the user computing device 203. For example, the interface data 234 may indicate a manner in which to display the second unit of text 228 and the result image 212 within an interface of an application executed by the user computing device 203 (e.g., a visual search application, etc.). Display of the second unit of text 228 and the result image 212 within the interface of the application executed by the user computing device 203 will be discussed in greater detail with regards to FIGS. 4, 5A, and 5B.

In some implementations, the interface data generation module 232 can generate attribution information 236. The attribution information 236 can be, or otherwise include, information that identifies the document 220. For example, if the document 220 is a news article, the attribution information 236 may be a title of the news article and a name of the publishing news organization. For another example, if the document 220 is an academic paper, the attribution information 236 may be a title of the academic paper, a primary author, a list of authors, a bibliographic citation, etc. For yet another example, if the document 220 is a website, or some other form of document accessible to the user computing device 203, the attribution information 236 can include a link that facilitates access to the document 220 (e.g., a URL, etc.).

Figure 3:
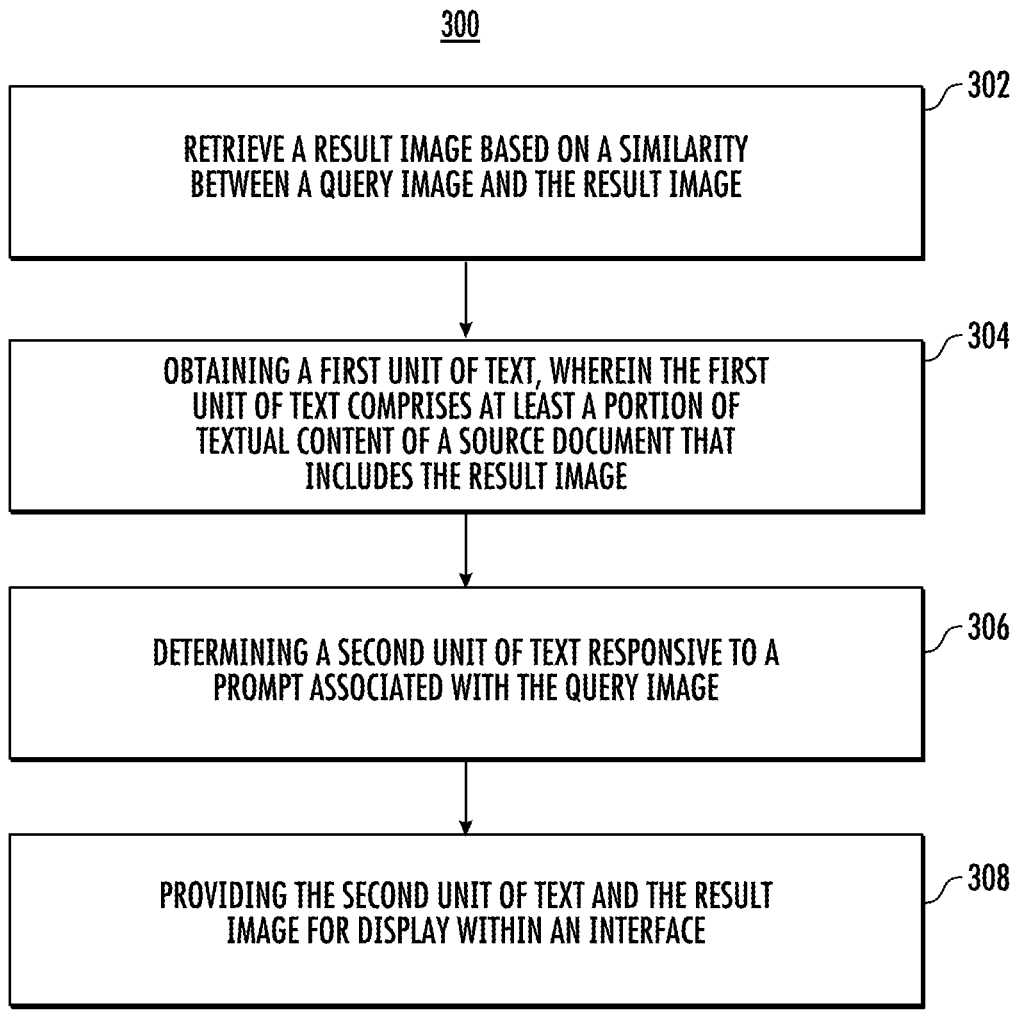
FIG. 3 is a flowchart diagram of an example method to perform generation of responses and corresponding visual citations for prompts according to some implementations of the present disclosure.

FIG. 3 is a flowchart diagram of an example method 300 to perform generation of responses and corresponding visual citations for prompts according to example embodiments of the present disclosure. Although FIG. 3 depicts operations performed in a particular order for purposes of illustration and discussion, the methods of the present disclosure are not limited to the particularly illustrated order or arrangement. The various operations of the method 300 can be omitted, rearranged, combined, and/or adapted in various ways without deviating from the scope of the present disclosure.

At 302, a computing system can retrieve a result image based on a similarity between a query image and the result image. In some implementations, to retrieve the result image, the computing system can process the query image with a machine-learned visual search model to obtain an intermediate representation of the query image, and select result images based on a similarity between the intermediate representation of the query image and an intermediate representation of the result image. For example, the machine-learned visual search model can be a machine-learned embedding model that generates an embedding of the query image for an image embedding space. The computing system can evaluate the embedding space that includes the embedding of the result image and a plurality of other image embeddings to retrieve the result image. The embedding of the result image can be the embedding to the query image embedding within the embedding space.

In some implementations, prior to retrieving the result image, the computing system can obtain the query image from a user computing device. In some implementations, the interface includes a user interface of an application executed by the user computing device. For example, the user computing device can execute a visual search application associated with a visual search service provided by the computing system. The visual search application can facilitate capture of the query image and the prompt for transmission to the computing system.

In some implementations, obtaining the query image can include obtaining the query image and the prompt associated with the query image from the user computing device. Additionally, in some implementations, the prompt can be modified by the computing system. For example, the prompt can be modified to include instructions that facilitate processing of the prompt by a large language model.

In some implementations, retrieving the result image further includes providing, for display within the interface, the result image to the user computing device, and, responsive to providing the result image, receiving the prompt associated with the query image from the user computing device. For example, the computing system can receive the query image and perform a visual search to obtain a result image. The computing system can provide the result image for display within an interface of the application executed by the user computing device. In response, the user of the user computing device can input a query to the user computing device which can be provided to the computing system.

At 304, the computing system can obtain a first unit of text, wherein the first unit of text comprises at least a portion of textual content of a source document that includes the result image. In some implementations, the document includes one or more web pages of a web site, an article, a newspaper, a book, or a transcript. For example, if the source document is a website article, the computing system can obtain a first unit of text that includes the textual content of the article, the title of the article, other textual content related to the website hosting the article, etc.

At 306, the computing system can determine a second unit of text responsive to a prompt associated with the query image, wherein the second unit of text comprises one or more of (a) at least some of the first unit of text (b) text derived from the first unit of text. In some implementations, determining the second unit of text responsive to the prompt associated with the query image includes processing the second unit of text and the prompt associated with the query image with a machine-learned language model to obtain a language output that includes the second unit of text. In some implementations, the second unit of text includes a subset of the first unit of text. In some implementations, the second unit of text includes text derived from the first unit of text, and wherein the text derived from the first unit of text is descriptive of a summarization of the first unit of text.

In some implementations, prior to determining the second unit of text, the computing system can generate the prompt associated with the query image based at least in part on the query image. For example, the computing system can process the query image with a machine-learned model, such as a semantic image analysis model, to generate a semantic output descriptive of the query image. The computing system can utilize the semantic output as the prompt.

At 308, the computing system can provide, for display within an interface, the result image and the second unit of text. For example, the computing system may transmit the result image and the second unit of text to the user computing device that provided the query image and the prompt. In some implementations, providing the result image and the second unit of text includes providing, for display within the interface, data descriptive of an interface element that includes the second unit of text and attribution element(s) including the result image(s) and attribution information that identifies the document(s) that include the result image(s). In some implementations, the document includes a web page, and the attribution information includes an address for the web page. Alternatively, in some implementations, the document includes a magazine, and wherein the attribution information includes a citation indicative of a location of the result image within the magazine.

Figure 4:
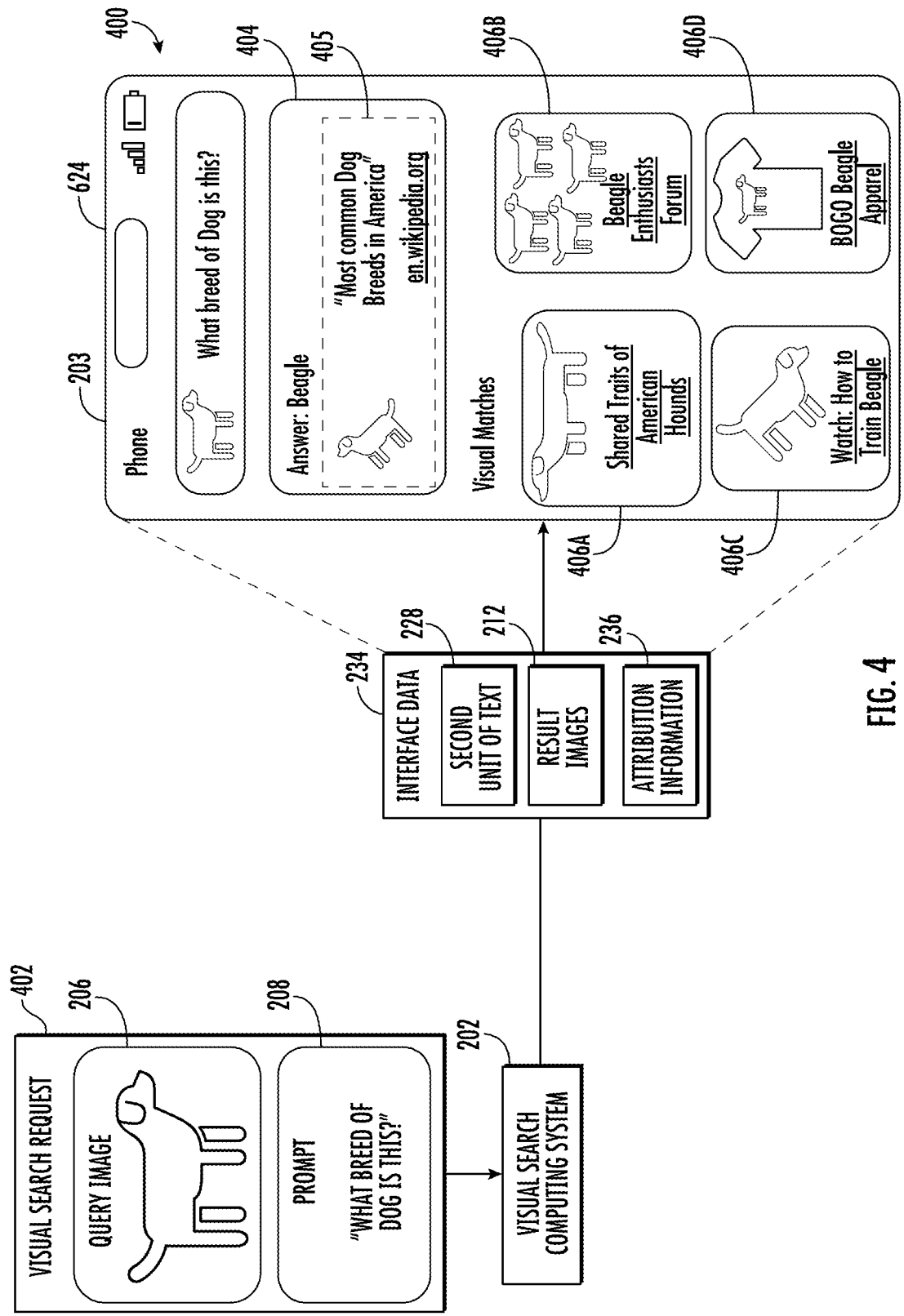
FIG. 4 depicts an example interface of a user computing device for display of textual content and corresponding interface elements according to some implementations of the present disclosure.

FIG. 4 depicts an example interface 400 of a user computing device for display of textual content and corresponding interface elements according to some implementations of the present disclosure. FIG. 4 is discussed in conjunction with FIG. 2. More specifically, visual search request 402 can include query image 206 and prompt 208 of FIG. 2. The visual search request 402 can be provided to visual search computing system 202 as described with regards to FIG. 2. The visual search computing system 202 can process the visual search request 402 to obtain the interface data 234. The interface data 234 can include the second unit of text 228 and the result images 212.

Specifically, the interface data 234 can indicate a manner in which the result image 212 and the second unit of text 228 are displayed within the interface 400 of the user computing device 203. For example, the user computing device 203 can execute a visual search application, or may already be executing an application integrated in an operating system of the user computing device 203. The application can display the interface 400 at a display device of the user computing device 203.

To follow the depicted example, the query image 206 can depict a certain breed of dog, such as a beagle. The prompt 208 can be a question, such as "what breed of dog is this?". The visual search computing system 202 can process the visual search request 402 to obtain the second unit of text 228 and result images 212, which can be included in the interface data 232. As depicted, the second unit of text 232 can include an answer to a query posed by the prompt 208, such as "answer: beagle". Similarly, the result images 212 can be retrieved due to a visual similarity between the query image 206 and the result images 212.

In some implementations, the interface data 234 can describe a manner in which the second unit of text 228 and the result images 212. For example, the interface data 234 can indicate the second unit of text 228 is to be presented within a primary interface element 404 to emphasize the second unit of text 228. The interface data 234 can further indicate that the primary interface element 404 is to include an attribution element 405.

The attribution element 405 can include the result image 212 and corresponding attribution information 236. The attribution information 236 can identify the document (e.g., document 220 of FIG. 2) that includes the result image 212, and from which the second unit of text 228 was extracted or derived. If the document is a website, or is otherwise accessible by the user computing device 203, the attribution information 236 can also provide a link to access the document. In such fashion, the attribution element 405 can serve as a "visual citation" that allows a user of the user computing device 203 to easily confirm the accuracy of the second unit of text 228.

In some implementations, in addition to the result image 212 included in the document from which the second unit of text 228 was derived, the interface data can include a plurality of other result images 212. The interface data 234 can indicate instructions to display the other result images 212 in result image elements 406A, 406B, 406C, and 406D (generally, result image elements 406). In some implementations, the result images 212 included in the result image elements 406 can be result images that are less similar to the query image 206 than the result image included in the primary interface element 404. For example, the visual search computing system 202 may select five result images 212 for inclusion in the interface data 234. The result image 212 most similar to the query image 206 (e.g., the image with an embedding closest to the embedding of the query image 206 within an embedding space) can be indicated for inclusion in the primary interface element 404. The result image elements 406 can include the other four result images 212.

As with the primary interface element 404, the result image elements 406 can include attribution information 236 that identifies the document including the result images 212 of the result image elements 406. To follow the depicted example, each result image element 406 can include a link to a website document that includes the result image 212 included in the respective result image element 406.

Figure 5A:
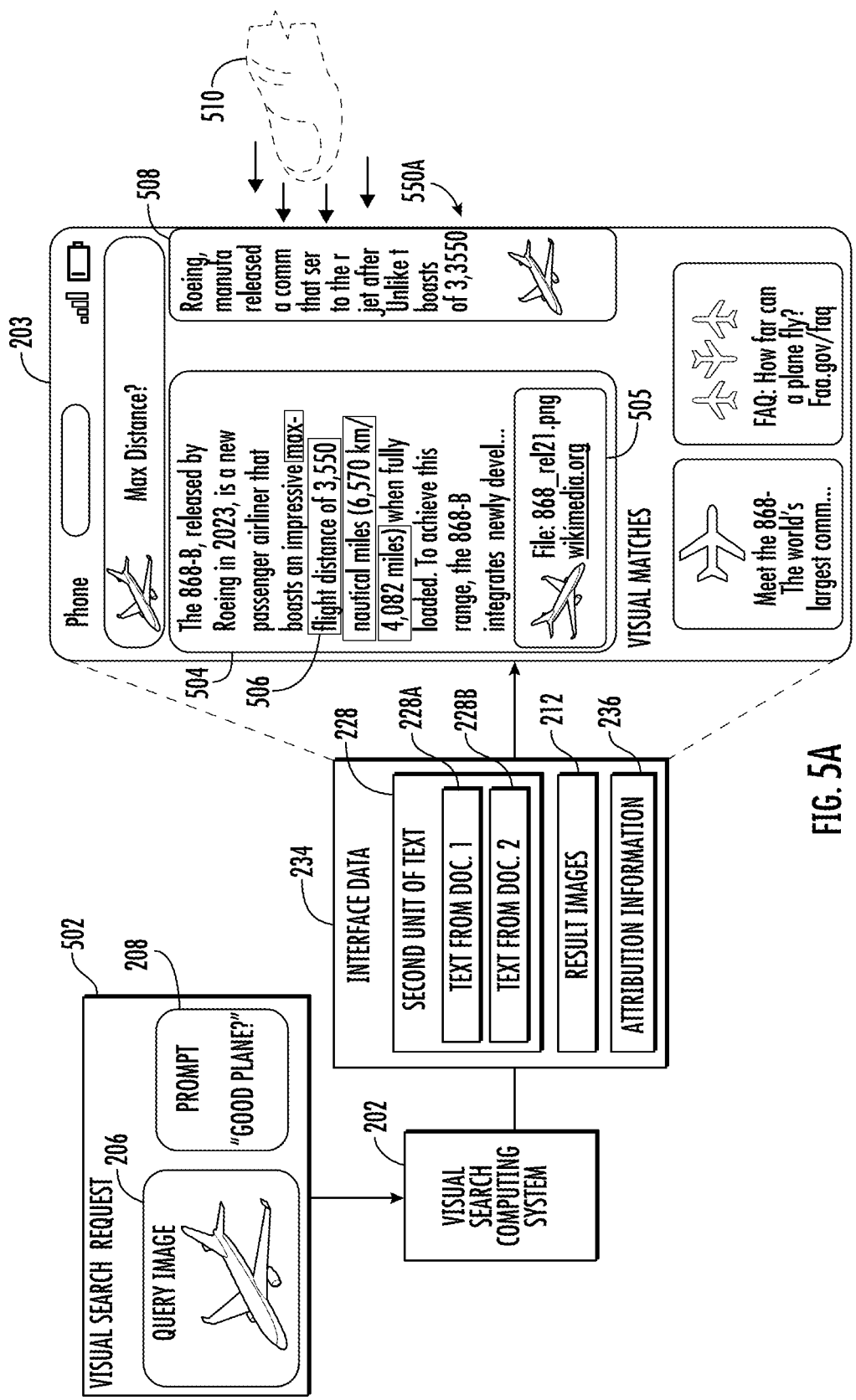
FIG. 5A depicts an example interface of a user computing device for display of textual content and corresponding interface elements according to some other implementations of the present disclosure.

FIG. 5A depicts an example interface 500A of a user computing device for display of textual content and corresponding interface elements according to some other implementations of the present disclosure. FIG. 5 is discussed in conjunction with FIGS. 2 and 4. The visual search request 502 can be provided to visual search computing system 202 as described with regards to FIG. 2. The visual search request can include the query image 206 and the prompt 208. The visual search computing system 202 can process the visual search request 502 to obtain the interface data 234. The interface data 234 can include the second unit of text 228 and the result images 212.

To follow the depicted example, the query image 206 can depict a certain type of passenger jet. The prompt 208 can be a statement, such as "good plane?", that may or may not serve as a query. The visual search computing system 202 can process the visual search request 502 to obtain the second unit of text 228, result images 212, and the attribution information 236, which can be included in the interface data 234. As depicted, the second unit of text 228 can include an answer to a query posed by the prompt 208. Similarly, the result images 212 can be retrieved due to a visual similarity between the query image 206 and the result images 212.

The interface 500A is similar to the interface 400 of FIG. 4, except that the interface 500A can display interface elements in a format different than the format in which interface elements are displayed in the interface 400 of FIG. 4. For example, in FIG. 4, primary interface element 404 includes textual content from the second unit of text 228, and attribution element 405, in a format that provides a clear answer to a query posed by a user. Unlike primary interface element 404, however, primary interface element 504 of FIG. 5A includes a first portion of textual content 228A that includes an excerpt from a first document that provides more contextual information regarding the query posed by the user in the prompt 208. In addition, the primary interface element 504 includes an emphasis element 506 that highlights, or emphasizes, information predicted to serve as an answer to a query posed by the prompt 208. The first document can be identified by the attribution element 505 in the same manner as described with regards to attribution element 405 of FIG. 4.

Specifically, when processing the prompt 208, the visual search computing system 202 can determine whether to generate interface data 234 for an interface element that includes a direct answer to a query, such as the interface element 404 of FIG. 4, or an interface element that includes contextual information that may assist a user, such as the interface element 504 of FIG. 5A. This determination can be based on a degree of certainty associated with information retrieved in response to the prompt 208, a semantic understanding of the prompt 208, etc. In the illustrated example, as "good plane" is a relatively subjective question, the visual search computing system 202 may determine to generate the illustrated interface data 234 based on a semantic understanding of the prompt 208. Determination of a type, manner, format, etc. of interface element to include in the interface data 234 will be discussed in greater detail with regards to FIGS. 6A-7B.

In some implementations, the interface data 234 can include information for display within multiple interface elements. In other words, the interface data 234 can include, or can be utilized to generate, multiple interface elements that include different textual content. To follow the depicted example, the interface data 234 can include information for inclusion in the primary interface element 504 and a second interface element 508. The second unit of text 228 included in the interface data 234 can include first textual content from a first document and second textual content from a second document. The first textual content can be provided for inclusion in the primary interface element 504, and the second textual content can be provided for inclusion in the second interface element 508.

The visual search computing system 202 can make a determination whether or not to generate interface data 234 that includes information for inclusion in multiple interface elements. Similarly to the determination of a format for the primary interface element 504, this determination can be made based on a semantic understanding of the prompt 208, a quantity, quality, and/or semantic understanding of the text retrieved in response to the prompt 208, etc. Additionally, in some implementations, the visual search computing system 202 can determine an order in which the interface elements 504 and 508 are to be presented to the user.

Assume that the user of the user computing device 203 did not find the information presented in the primary interface element 504 to be sufficient. The user can provide an input 510 to the user computing device 203 that instructs the user computing device 203 to display the second interface element 508. To follow the illustrated example, the user can provide a "swipe" touch input 510 that moves the second interface element 508 from a position in which the element is mostly occluded to a position in which the element is fully visible.

Figure 5B:
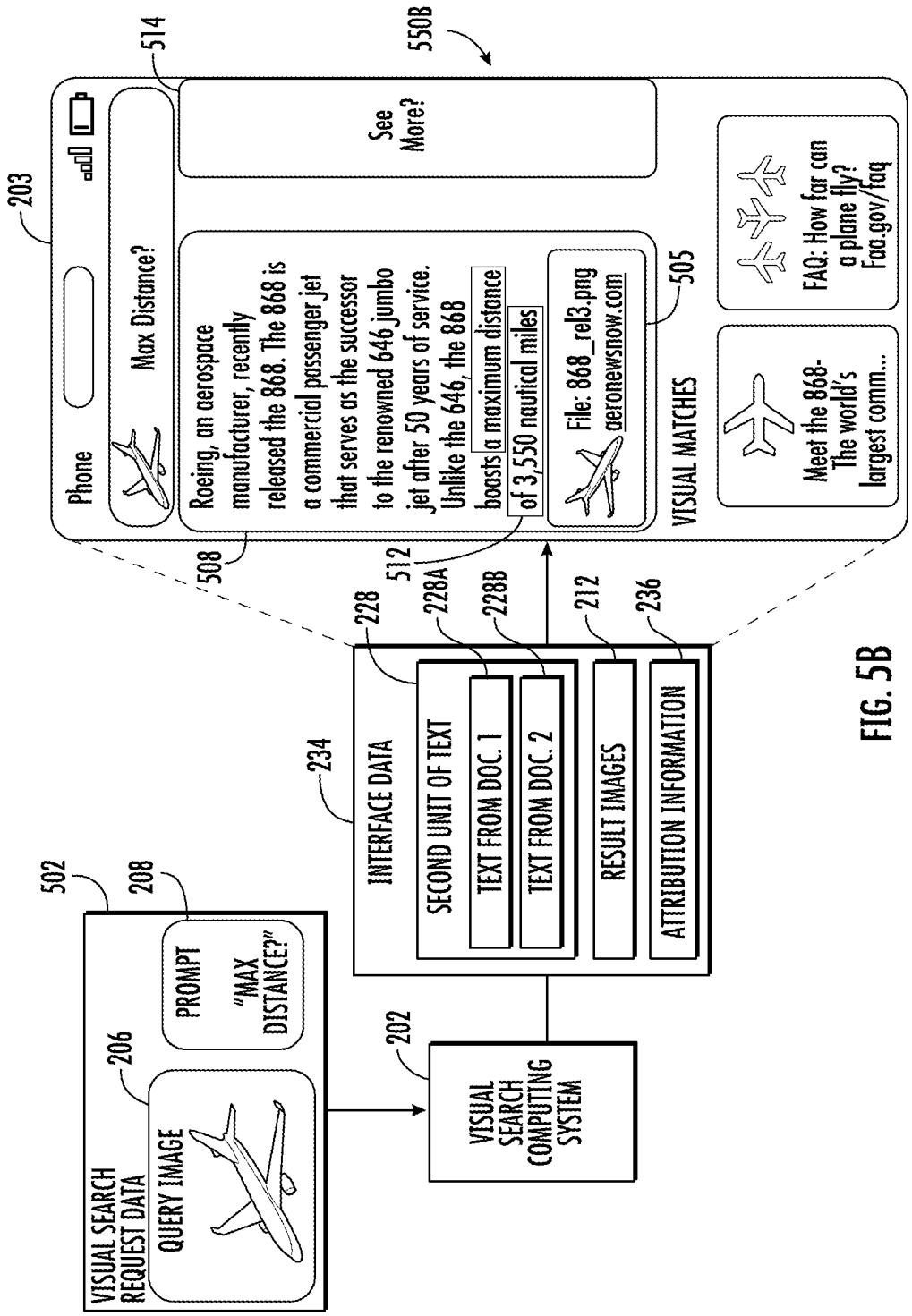
FIG. 5B an example interface of a user computing device displayed subsequently to the interface of FIG. 5A in response to receipt of a user input according to some implementations of the present disclosure.

For example, FIG. 5B depicts an example interface 500B of a user computing device displayed subsequently to the interface 500A of FIG. 5A in response to receipt of a user input according to some other implementations of the present disclosure. Turning to FIG. 5B, the interface 500B is displayed in response to receipt of the input 510 from the user. As depicted, in the interface 500B, the primary interface element 504A has been shifted to a position of full occlusion, while the second interface element 506 has been shifted to a position of full visibility. Like the primary interface element 504A, the second interface element can include a second emphasis element 512 that emphasizes, highlights, or otherwise indicates a portion of the second textual content 228B that is predicted to be of particular relevance to the prompt 208.

In some implementations, the interface 500B of the user computing device 203 can include an information request element 514 that a user can select to indicate a request for additional information. For example, assume that the visual search computing system 202 determines that the information included in the second unit of text 228 is relatively likely to be sufficient for the prompt 208. Rather than continue to retrieve information for inclusion in third, fourth, or fifth interface elements, the visual search computing system 202 can determine to only include the first textual content 228A and the second textual content 228B in the interface data 234 to reduce the expenditure of compute resources (e.g., compute cycles, memory utilization, power, storage, bandwidth, network resources, etc.), reduce latency, and increase efficiency.

However, if the user decides that the information included in the primary interface element 504 and the second interface element 506 is insufficient, the user can select the information request element 514. Upon selection of the information request element 514, the user computing device 203, the user computing device 203 can transmit the request to the visual search computing system 202. In response, the visual search computing system 202 can generate additional interface data for inclusion in a third interface element (or more). In such fashion, the visual search computing system 202 can facilitate iterative exploration of information in response to a prompt 208 while eliminating the unnecessary utilization of computing resources.

Figure 6A:
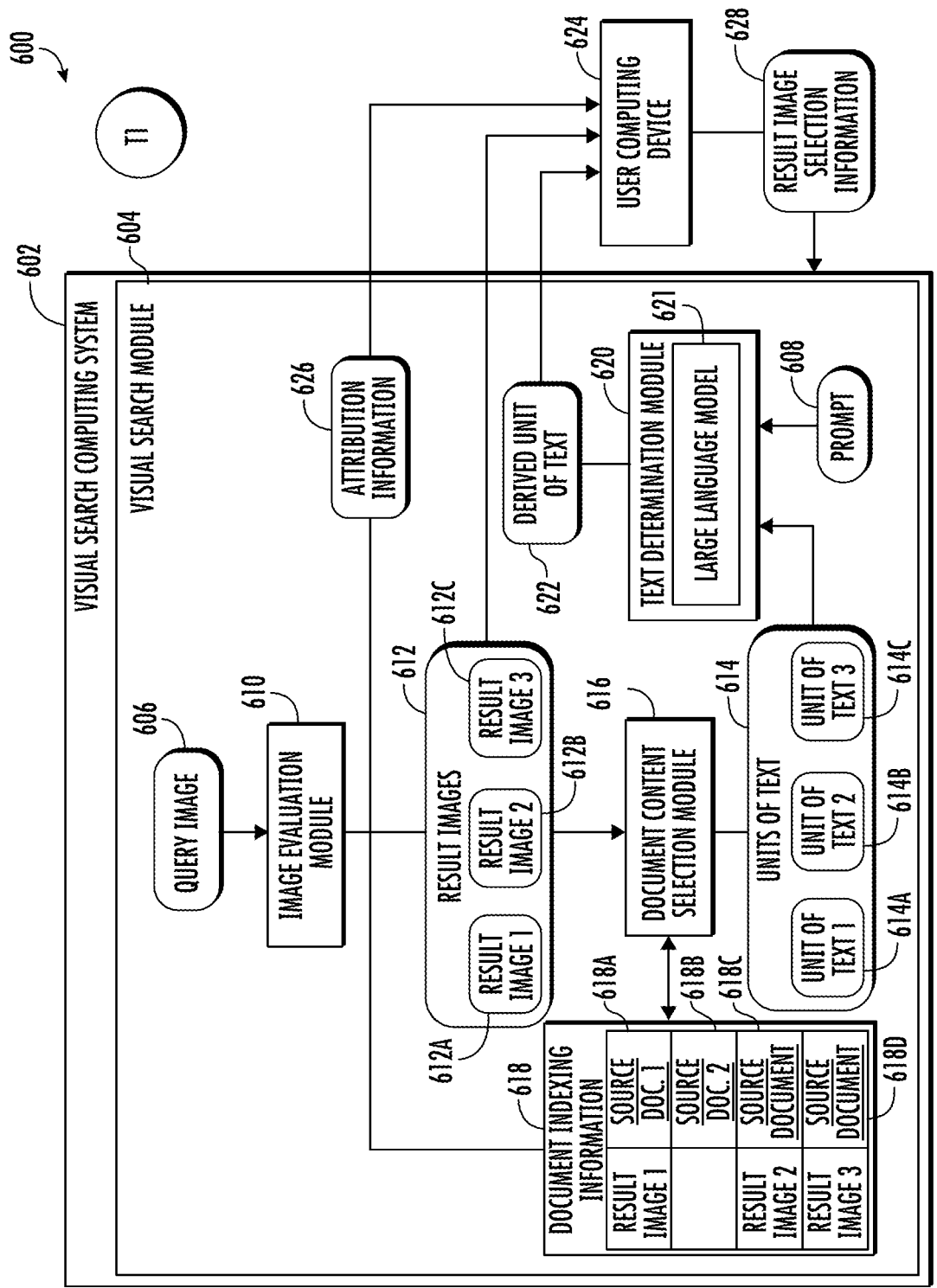
FIG. 6A is a data flow diagram for dynamic refinement of visual search information responsive to user feedback at a first time period T1 according to some implementations of the present disclosure.

FIG. 6A is a data flow diagram for dynamic refinement of visual search information responsive to user feedback at a first time period T1 according to some implementations of the present disclosure. In particular, a visual search computing system 602 (e.g., visual search computing system 202 of FIG. 2, etc.) can include a visual search module 604 (e.g., visual search module 204 of FIG. 2, etc.). At a first time period T1, the visual search computing system 602 can obtain a query image 606 and a prompt 608, and can process the query image 606 and the prompt 608 with the visual search module 604.

More specifically, at the first time T1, the visual search module 604 can process the query image 606 with an image evaluation module 610 as described with regards to previous figures, such as the image evaluation module 210 of FIG. 2, to obtain result images 612. The result images 612 can include a first result image 612A, a second result image 612B, and a third result image 612C. The visual search module 604 can obtain units of text 614 from documents associated with the result images 612. Specifically, the visual search module 604 can utilize a document content selection module 616 to obtain information from documents that include the result images 612 based on document indexing information 618. The document indexing information 618 can store information indicative of documents in which result images were located when indexed by the visual search computing system.

To follow the depicted example, assume that the result image 612A, when indexed by the visual search computing system 602, was included in two separate documents 618A and 618B. The document indexing information 618 can either store the textual content included in the documents 618A and 618B at the time of indexing, or may store information indicative of a location from which access the documents 618A and 618B (e.g., a URL, download link, file location, etc.). For example, if the documents 618A and 618B are published academic journal articles, the visual search computing system 602 may store the textual content included in the documents directly, as the textual content is relatively unlikely to change over time. Conversely, if the documents 618A and 618B are both website pages, the visual search computing system 602 may store a URL from which the documents 618A and 618B can be accessed, as information included in website pages is relatively more likely to be updated or iterated upon over time.

Continuing the previous example, the units of text 614 can include a first unit of text 614A, a second unit of text 614B, and a third unit of text 614C. Each of the units of text can include textual content included in document(s) that include the result images 612. For example, as result image 612A is included in documents 618A and 618B, the unit of text 614A that corresponds to the result image 612A can include textual content from both of the documents 618A and 618B. Unit of text 614B, which corresponds to result image 612B, can include textual content from document 618C, which includes result image 612B. Unit of text 614C can include textual content from document 618D, which includes result image 612C.

The visual search computing system 602 can process the units of text 614 and the prompt 608 with a text determination module 620 to obtain a derived unit of text 622 as described with regards to the text determination module 226 of FIG. 2. More specifically, the text determination module can process a set of textual inputs that includes (a) the units of text 614 and (b) the prompt 608 to obtain the derived unit of text 622. For example, the text determination module 620 can include a large language model 621. The large language model 621 can be a model trained on a large and varied corpus of data for performance of multiple types of language tasks. The large language model 621 can process a set of textual inputs to generate the derived unit of text 622. The set of textual inputs can include the units of text 614 and the prompt 608.

In some implementations, the derived unit of text 622 can be a language output from a machine-learned language model included in the text determination module 620. As such, the derived unit of text 622 may be a generative language output that includes some textual content generated from, but not included in, the units of text 614. Additionally, or alternatively, the derived unit of text 622 may be a language output that includes some (or all) textual content of the units of text 614.

The visual search computing system 602 can provide the result images 612 and the derived unit of text 622 to a user computing device 624 for display within an interface of the user computing device 624. Additionally, in some implementations, the visual search computing system 602 can provide attribution information 626 to the user computing device 624 alongside the result images 612 and the derived unit of text 622. For example, the attribution information 626 can include the information stored in the document indexing information 618 that identifies, and/or provides access to, the documents 618A-618D.

In some implementations, in response to receiving the result images 612, the derived unit of text 622, and the attribution information 626, the user computing device 624 can provide result image selection information 628 to the visual search computing system 602. The result image selection information 628 can be information generated in response to a user input collected at the user computing device 624 that selects one of the result images 612 within an interface to indicate that the selected result image 612 is inaccurate.

Figure 7A:
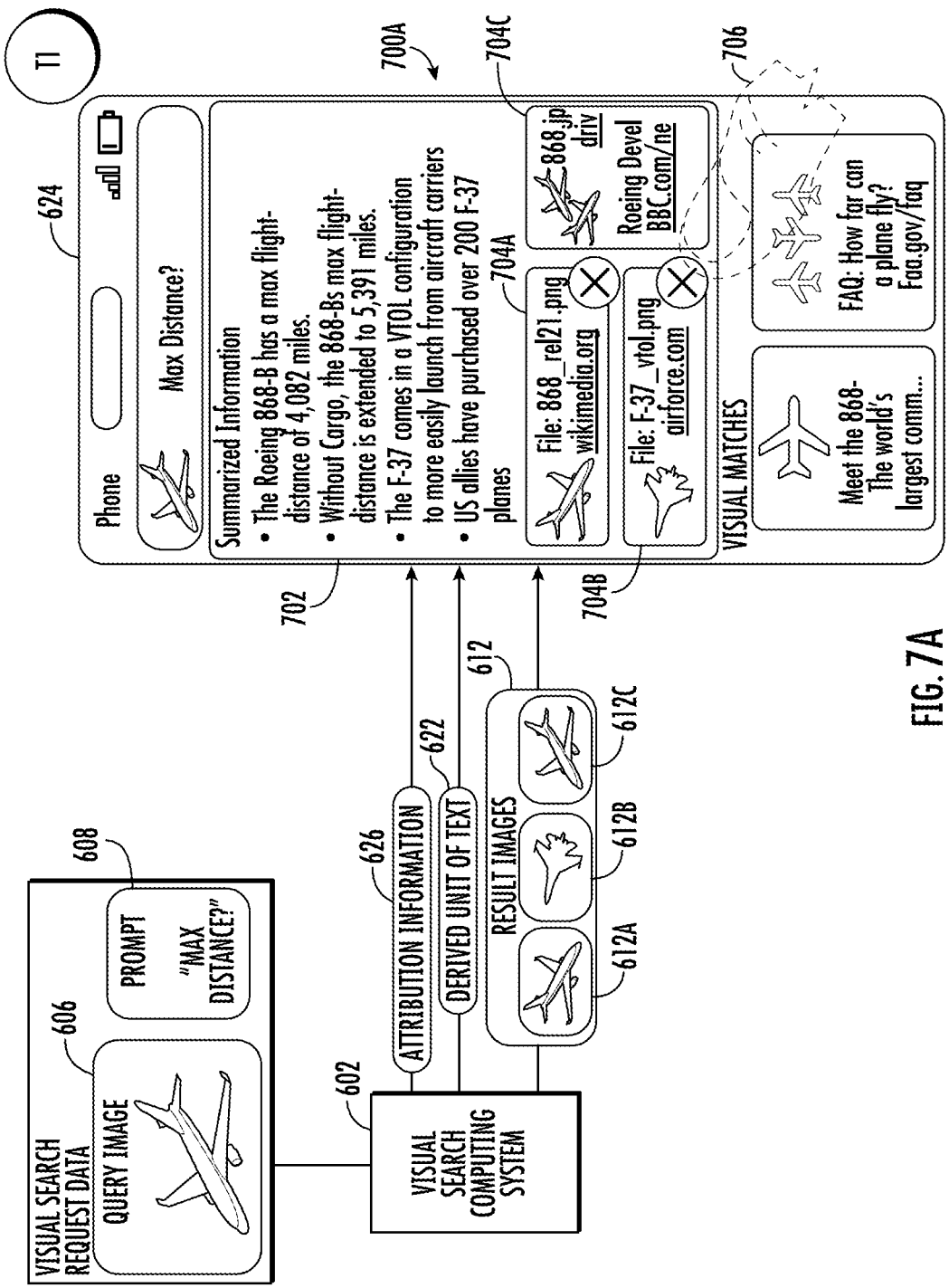
FIG. 7A depicts an example interface of a user computing device for collecting user feedback on derived textual content and corresponding result images according to some implementations of the present disclosure.

For example, turning to FIG. 7A, FIG. 7A depicts an example interface 700A of a user computing device for collecting user feedback on derived textual content and corresponding result images according to some implementations of the present disclosure. FIG. 7A is discussed with regards to FIG. 6A. In particular, assume that the query image 606 is an image of a passenger jet, and the prompt 608 is a query "Max distance?". In response, the visual search computing system 602 can generate and provide attribution information 626, derived unit of text 622, and result images 612 for display in the interface 700A of the user computing device 624.

The user computing device 624 can display this information in interface 700A. The interface 700A can include an interface element 702 that includes the derived unit of text 622. To follow the depicted example, the derived unit of text 622 can include information regarding the max distance of the passenger jet depicted in the query image 606 that was retrieved in response to the prompt 608. Here, the derived unit of text 622 is information related to the maximum distance of the passenger jet summarized from multiple source documents.

In addition, the interface 700A can include selectable attribution elements 704A, 704B, and 704C (generally, selectable attribution elements 704). Selectable attribution elements 704 are interface elements that include result images and attribution information that identifies the documents that include the result images. In particular, the documents identified by the selectable attribution elements 704 are the documents from which the derived unit of text 622 was derived. Based on the assumption that the textual content of a document is closely related to an image included in the document, a user can quickly and efficiently evaluate the relevance of a document used to derive the derived unit of text 622 by viewing the result image included in the attribution element associated with the document. To indicate that a result image (and thus the document that includes the result image) is not relevant, a user can select the selectable attribution element 704 that includes the result image.

For example, selectable attribution element 704A includes result image 612A and attribution information 626 indicating an identity of the document (e.g., document 618A) that includes the result image 612A. As the result image 612A included in the selectable attribution element 704A is a close visual match to the query image 606, the user is unlikely to select the selectable attribution element 704A. However, result image 612B, which is included in selectable attribution element 704B, is clearly visually dis-similar to the query image 606, as the query image 606 depicts a passenger jet and the result image 612B depicts a fighter jet. Due to this visual discrepancy, the user can provide an input 706 that selects the attribution element 704B.

As illustrated in FIG. 7A, the textual content included in the document 618C, which includes the result image 612B (i.e., the "source" of result image 612B), is related to fighter jets rather than passenger jets and is thus irrelevant to the prompt 608 and query image 606. Because the derived unit of text 622 is generated based at least in part on textual content from the document 618C, it is relatively likely that the derived unit of text 622 is at least partially inaccurate. This is illustrated in the summarized information included in interface element 702, which includes information related to a fighter jet (e.g., "The F-37 comes in a VTOL configuration to more easily launch from aircraft carriers, "US allies have purchased over 200 F-37 planes," etc.).

By providing the input 706 that selects the attribution element 704B, the user can indicate to the user computing device 624, and thus the visual search computing system 602, that the document(s) that include the result image 612B are not relevant to the prompt 608 and thus should not be utilized to generate the derived unit of text 622. In response to receiving the input 706, the user computing device 624 can generate and provide the result image selection information 628 to the visual search computing system 602.

Figure 6B:
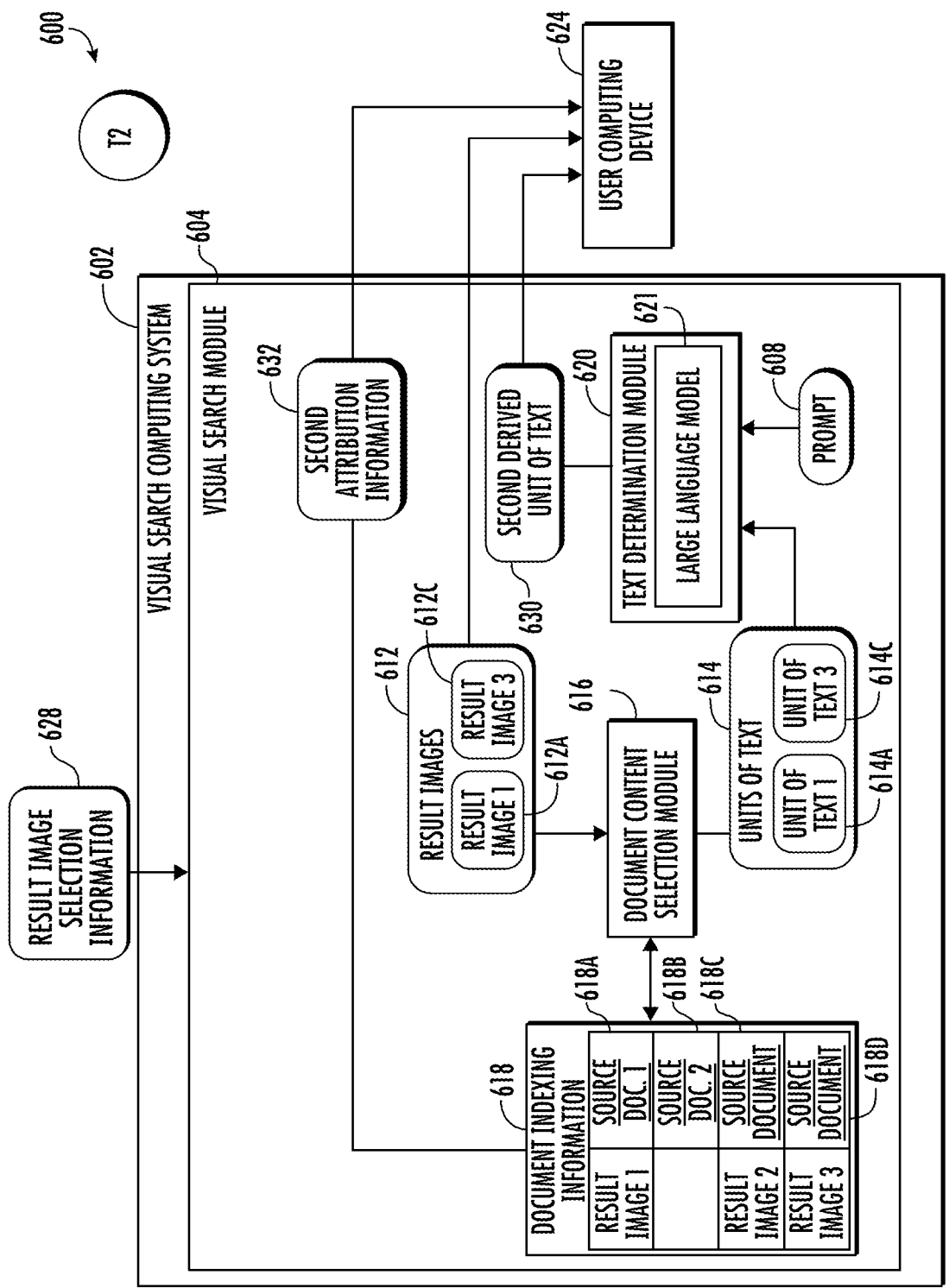
FIG. 6B is a data flow diagram for dynamic refinement of visual search information responsive to user feedback at a second time period T2 according to some implementations of the present disclosure.

Turning to FIG. 6B, FIG. 6B is a data flow diagram for dynamic refinement of visual search information responsive to user feedback at a second time period T2 according to some implementations of the present disclosure. In particular, the visual search computing system 602 can receive the result image selection information 628. The result image selection information 628 can indicate that the result image 612B is not visually similar to the query image 606. In response, at time T2, the visual search computing system 602 can generate a second derived unit of text 630 that is generated based on each of the previous units of text 614 except for the unit of text 614B extracted from the document 618B that included the result image 612B.

The visual search module 604 can receive the result image selection information 628 indicating selection of the attribution element 704B which includes the result image 612B. In response, the visual search module 604 can identify each unit of text previously used to generate the derived unit of text 622. The visual search module 604 can then remove any units of text obtained from the document 618C that served as the source document of the result image 612B (e.g., the document that included result image 612B).

For example, to generate the derived unit of text 622, the visual search module may have processed a first set of textual inputs that included unit of text 614A, unit of text 614B, unit of text 614C, and prompt 608. Responsive to the result image selection information, the visual search module 604 can determine a second set of textual inputs that includes each unit of text of the first set of textual inputs other than the unit of text 614B associated with the result image 612B included in the selectable attribution element 704B indicated by the result image selection information 628. Here, the second set of textual inputs can include the unit of text 614A, the unit of text 614C, and the prompt 608.

Once determined, the visual search module 604 can process the second set of textual inputs with the large language model 621 to generate a second derived unit of text 630. As the second derived unit of text 630 is not based on information indicated to be inaccurate by the user, it can be assumed that the second derived unit of text 630 includes information that is more accurate than the information included in the derived unit of text 622. In such fashion, the visual search computing system 602 can dynamically and iteratively refine visual search information (e.g., derived units of text, attribution information, result images, etc.) responsive to user feedback. The second unit of text 630 can be provided to the user computing device 624 for display within the interface of the user computing device 624.

In some implementations, the visual search module 604 can generate second attribution information 632. The second attribution information 632 can include all of the information included in the attribution information 626 other than the attribution information related to the document 618C. Alternatively, in some implementations, the second attribution information 632 can include instructions to not display information related to document 618C in the interface of the user computing device 624. Additionally, or alternatively, in some implementations, the visual search module 604 can re-transmit the result images 612 other than the result image included in the selectable attribution element 704B.

Figure 7B:
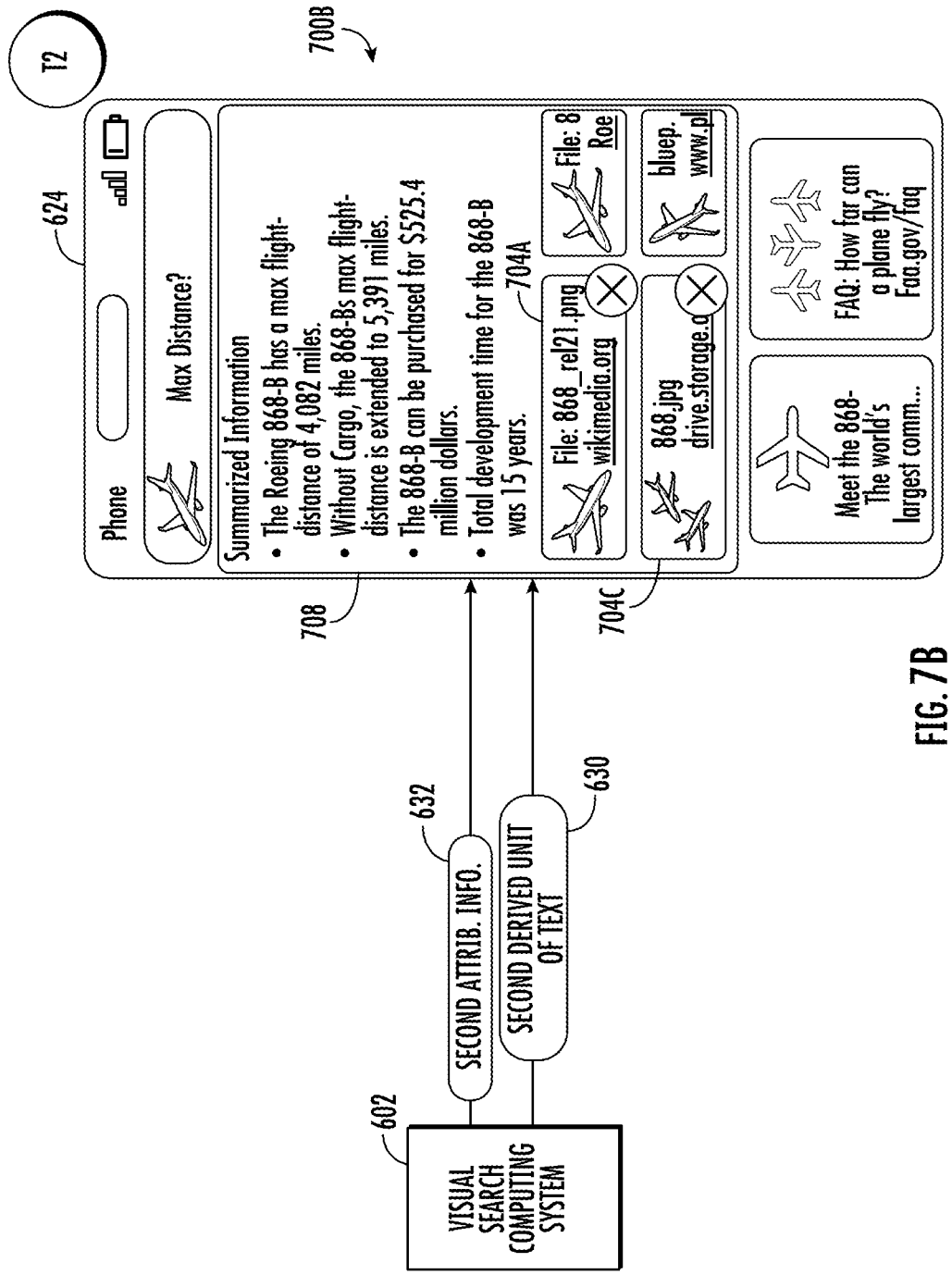
FIG. 7B depicts an example interface of a user computing device for display of visual search information refined based on user feedback according to some implementations of the present disclosure.

For example, turning to FIG. 7B, FIG. 7B depicts an example interface 700B of a user computing device for display of visual search information refined based on user feedback according to some implementations of the present disclosure. In particular, at time T2, upon receipt of the result image selection information 628, the visual search computing system 602 can generate and provide second attribution information 632 and second derived unit of text 630 to the user computing device 624 for display within interface 700B.

Interface 700B can include an interface element 708 that includes the second derived unit of text 630. As illustrated, since the second derived unit of text 630 is not generated based on the information included in document 618C, the second derived unit of text 630 does not include inaccuracies associated with the content of document 618C (e.g., information regarding fighter jet planes). Additionally, in response to the input 706 that selected the selectable attribution element 704B, the selectable attribution element 704B has been removed from the interface 700B. Instead, additional selectable attribution elements can be displayed in place of the attribution element 704B. In such fashion, the user computing device 624 can communicate with the visual search computing system 602 to refine visual search information based on user feedback.

Figure 8:
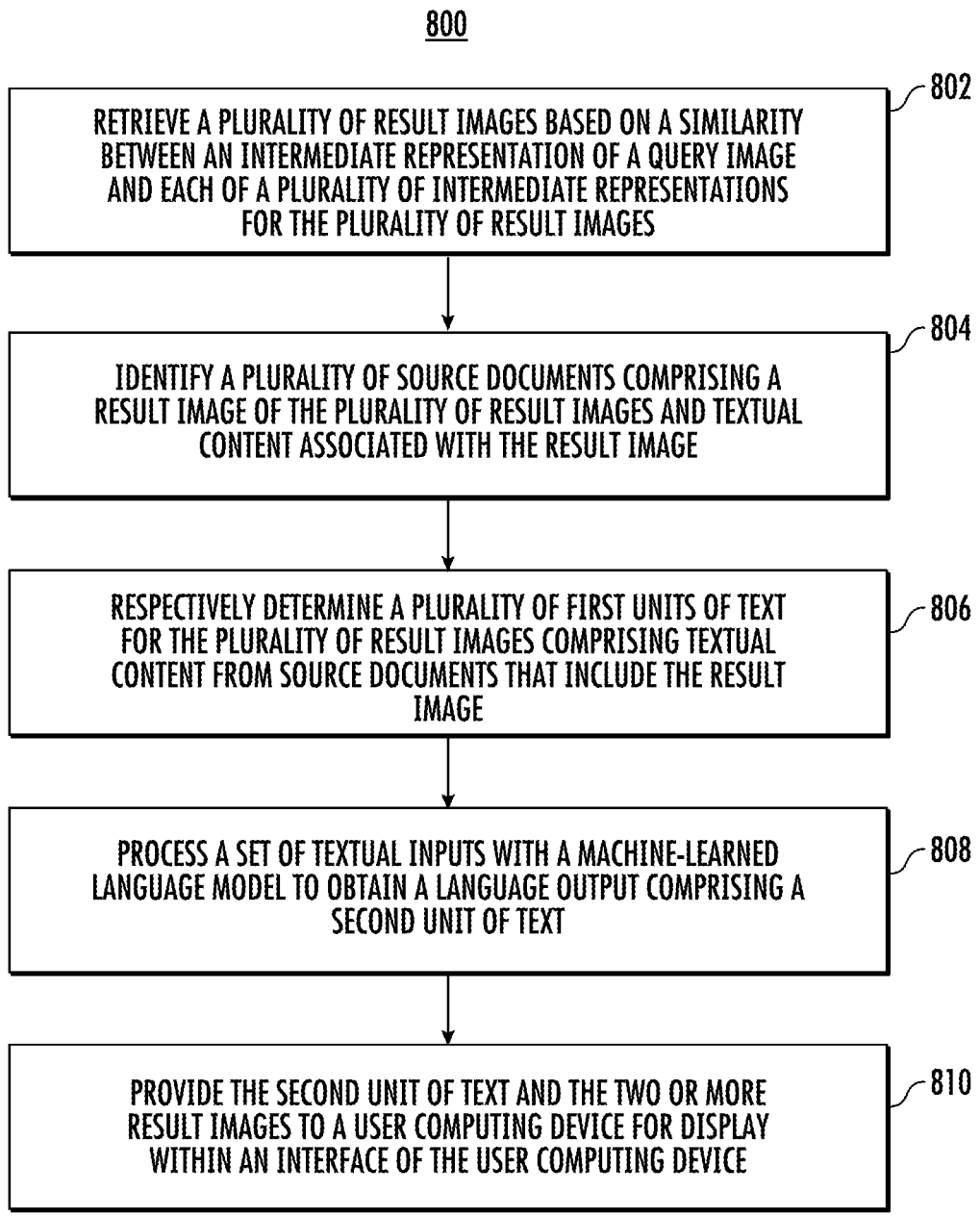
FIG. 8 depicts a flow chart diagram of an example method to provide visual search information derived from documents that include images retrieved based on a visual similarity with a query image according to some implementations of the present disclosure.

FIG. 8 depicts a flow chart diagram of an example method 800 to provide visual search information derived from documents that include images retrieved based on a visual similarity with a query image according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can retrieve a plurality of result images based on a similarity between an intermediate representation of a query image and each of a plurality of intermediate representations respectively associated with the plurality of result images. In some implementations, retrieving the plurality of result images can include processing the query image with a machine-learned visual search model to obtain the intermediate representation (e.g., an embedding, an encoding, a latent representation, etc.) of the query image. The computing system can retrieve the result image based on a degree of similarity between the intermediate representation of the query image and intermediate representations of the plurality of result images.

In some implementations, processing the query image with the machine-learned visual search model can include processing the query image with a machine-learned embedding model to obtain a query image embedding for the query image. The computing system can retrieve the plurality of result images based on a distance between the query image embedding and embeddings of the plurality of result images within an embedding space.

In prior to processing the query image, the operations comprise obtaining the query image from the user computing device. For example, a user can utilize the user computing device to capture an image that depicts an unfamiliar object. To learn more about the object, the user can use a visual search service by providing the image and an associated prompt (e.g., "what is this object", etc.) to the computing system. Alternatively, in some implementations, the computing system can receive the image and an associated prompt from an automated service or software program. For example, an indexing service can provide an image to the computing system with an associated prompt corresponding to an indexing task (e.g., "what primary keywords should be associated with this image", etc.). Additionally, or alternatively, in some implementations, a user computing device can automatically capture an image, generate a prompt, and send the image and the prompt to the computing system. For example, the user computing device may be a wearable augmented reality (AR)/virtual reality (VR) device. The user computing device can capture an image of an object and send the image to the computing system with an automatically generated prompt (e.g., "identify this object and provide relevant, summarizing information", etc.). The user computing device can then display such information in an AR/VR context.

At 804, the computing system can identify a plurality of source documents. Each of the plurality of source documents can include a result image of the plurality of result images and textual content associated with the result image. In some implementations, identifying the plurality of source documents further includes obtaining attribution information for each of the source documents. The attribution information can include (a) identifying information that identifies the source document (e.g., a title, a citation, a numerical identifier such as a digital object identifier (DOI), etc.), and/or (b) information descriptive of a location from which the source document can be accessed (e.g., a file path, a link to download or purchase an application, a URL, a hotlink, an API call to a library or other information repository that may retain a physical copy of the document, etc.).

At 806, the computing system can respectively determine a plurality of first units of text for the plurality of result images. Each first unit of text can include at least a portion of the textual content associated with the result image from one or more source documents that include the result image. As an example, assume that a first document that includes a first result image is an online article for a popular blog. In some instances, if the first result image is one of many images included in the article, it is relatively likely that only the textual content located closest to the first result image within the article is relevant to the first result image, and thus, the computing system can determine to select textual content located close to the first result image within the article for inclusion in the first unit of text. Alternatively, if the article is smaller, and only includes a few paragraphs, or only includes the first result image, the computing system may determine to select all of the textual content of the article for inclusion in the first unit of text.

As such, it should be understood that the computing system can utilize any conventional technique for determining which portions of textual content from source document(s) to include in a first unit of text. In some implementations, the computing system can process the textual content of a source document with a machine-learned model, such as a classification model, to predict the relevance of various portions of the textual content to the result image. Additionally, or alternatively, in some implementations, the computing system can utilize a heuristic approach to selecting textual content for inclusion in a first unit of text. For example, the computing system may utilize a rule-based schema such as:

IF doc_type==article;
   THEN retrieve sentences X−5 to X+5, where X is a location of the image in the document;
IF doc_length<=1000 words;
   THEN retrieve all words;

At 808, the computing system can process a set of textual inputs with a machine-learned language model to obtain a language output. The language output can include a second unit of text. The set of textual inputs can include (a) two or more first units of text respectively associated with two or more result images of the plurality of result images, and (b) a prompt associated with the query image.

At 810, the computing system can provide the second unit of text and the two or more result images to a user computing device for display within an interface of the user computing device. In some implementations, providing the second unit of text and the two or more result images to the user computing device for display within the interface of the user computing device includes providing interface data to the user computing device. The interface data can include instructions to generate (a) an interface element including the second unit of text, and (b) two or more selectable attribution elements respectively associated with the two or more result images. Each selectable attribution element can include an associated result image, or some representation of the result image, such as a thumbnail. The selectable attribution element can also include the attribution information for the one or more source documents that include the associated result image.

In some implementations, the computing system can receive, from the user computing device, data indicative of selection of a first selectable attribution element of the two or more selectable attribution elements by a user of the user computing device. The first selectable attribution element can be associated with a first result image of the two or more result images. The computing system can identify a first unit of text of the two or more first units of text that includes at least a portion of textual content from the source document that includes the first result image. The computing system can remove the first unit of text from the set of textual inputs to obtain a second set of textual inputs. The computing system can process the second set of textual inputs with the machine-learned language model to obtain a second language output comprising a refined second unit of text. The computing system can provide the refined second unit of text to the user computing device.

In some implementations, removing the first unit of text from the set of textual inputs to obtain the second set of textual inputs further includes removing information associated with the source document that includes the first result image from the attribution information to obtain refined attribution information. Providing the refined second unit of text to the user computing device further can include providing the refined attribution information to the user computing device.

In some implementations, the language output can further include predictive information that predicts a portion of the second unit of text as being most relevant to the prompt. The interface data can further include instructions to generate an emphasis element that highlights the portion of the second unit of text.

In some implementations, providing the second unit of text and the two or more result images to the user computing device for display within the interface of the user computing device can include providing interface data to the user computing device. The interface data can include instructions to generate a first interface element, a second interface element, and first and second attribution elements. The first interface element can include a first portion of the second unit of text. The first portion of the second unit of text can be associated with a first result image of the two or more result images. For example, if the second unit of text is a summarization of a first document that includes the first result image and a second document that includes the second result image, the first portion of the second unit of text can be the portion that summarizes the first document. Similarly, the second interface element can include a second portion of the second unit of text. The second portion of the second unit of text can be associated with a second result image of the two or more result images. The first selectable attribution element can include a thumbnail of the first result image, the result image itself, or an image derived from the result image, and can include the attribution information for the source document that includes the first result image. The second selectable attribution element can include the second result image (or a thumbnail or image derived therefrom) and the attribution information for the source document that includes the second result image.

Figure 9:
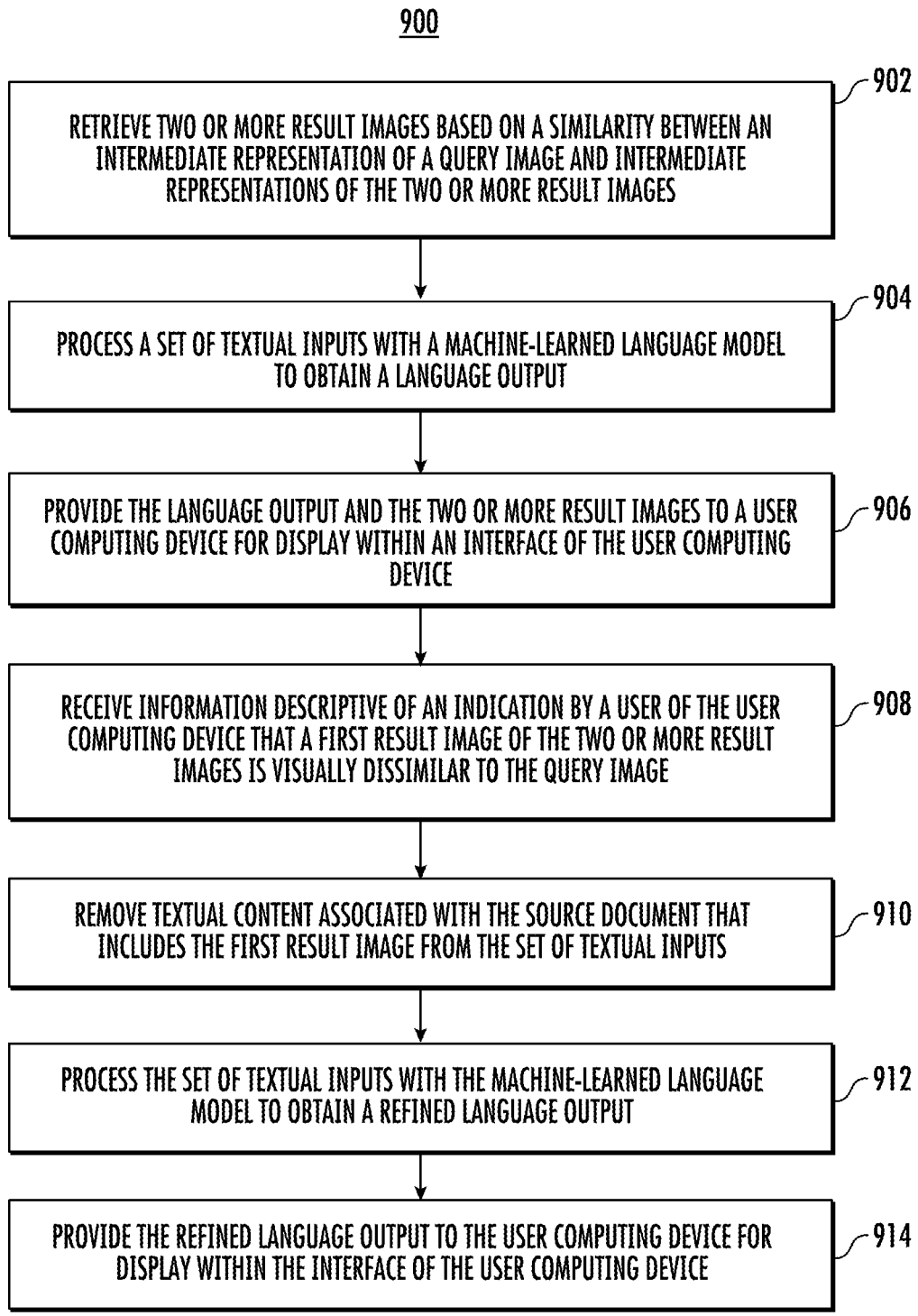
FIG. 9 depicts a flow chart diagram of an example method to refine visual search information based on user feedback according to some implementations of the present disclosure.

FIG. 9 depicts a flow chart diagram of an example method 900 to refine visual search information based on user feedback according to example embodiments of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

At 902, a computing system can retrieve two or more result images based on a similarity between an intermediate representation of a query image and intermediate representations of the two or more result images. For example, the intermediate representation may be an image embedding, and the computing system can retrieve the two or more result images based on a distance between the image embedding and image embeddings for the two or more result images in an embedding space.

At 904, the computing system can process a set of textual inputs with a machine-learned language model to obtain a language output that includes textual content. The set of textual inputs can include textual content from source documents that include the two or more result images, and a prompt associated with the query image.

In some implementations, processing the set of textual inputs with the machine-learned language model can include obtaining attribution information for each of the source documents. The attribution information can include (a) identifying information that identifies the source document, and/or (b) information descriptive of a location from which the source document can be accessed.

At 906, the computing system can provide the language output and the two or more result images to a user computing device for display within an interface of the user computing device. For example, if the user computing device is executing a visual search application associated with a visual search service offered by the computing system, the computing system can provide the language output and the result images for display within the interface of the visual search application. In some implementations, the computing system can also provide the attribution information.

In some implementations, providing the language output and the two or more result images to the user computing device for display within the interface of the user computing device can include providing interface data to the user computing device. The interface data can include instructions to generate (a) an interface element comprising the language output, and (b) two or more selectable attribution elements respectively associated with the two or more result images. Each attribution element can include a thumbnail of the associated result image and the attribution information for one or more source documents that include the associated result image.

At 908, the computing system can receive, from the user computing device, information descriptive of an indication by a user of the user computing device that a first result image of the two or more result images is visually dissimilar to the query image. In some implementations, receiving the information descriptive of the indication by the user of the user computing device that the first result image of the two or more result images is visually dissimilar to the query image can include receiving data indicative of selection of a first selectable attribution element of the two or more selectable attribution elements by the user of the user computing device. The first selectable attribution element can be associated with the first result image of the two or more result images.

At 910, the computing system can remove textual content associated with the source document that includes the first result image from the set of textual inputs. In some implementations, removing the textual content associated with the source document that includes the first result image from the set of textual inputs further includes removing information associated with the source document that includes the first result image from the attribution information to obtain refined attribution information. In some implementations, providing the refined language output to the user computing device further includes providing the refined attribution information to the user computing device.

At 912, the computing system can process the set of textual inputs with the machine-learned language model to obtain a refined language output.

At 914, the computing system can provide the refined language output to the user computing device for display within the interface of the user computing device.

Figure 10:
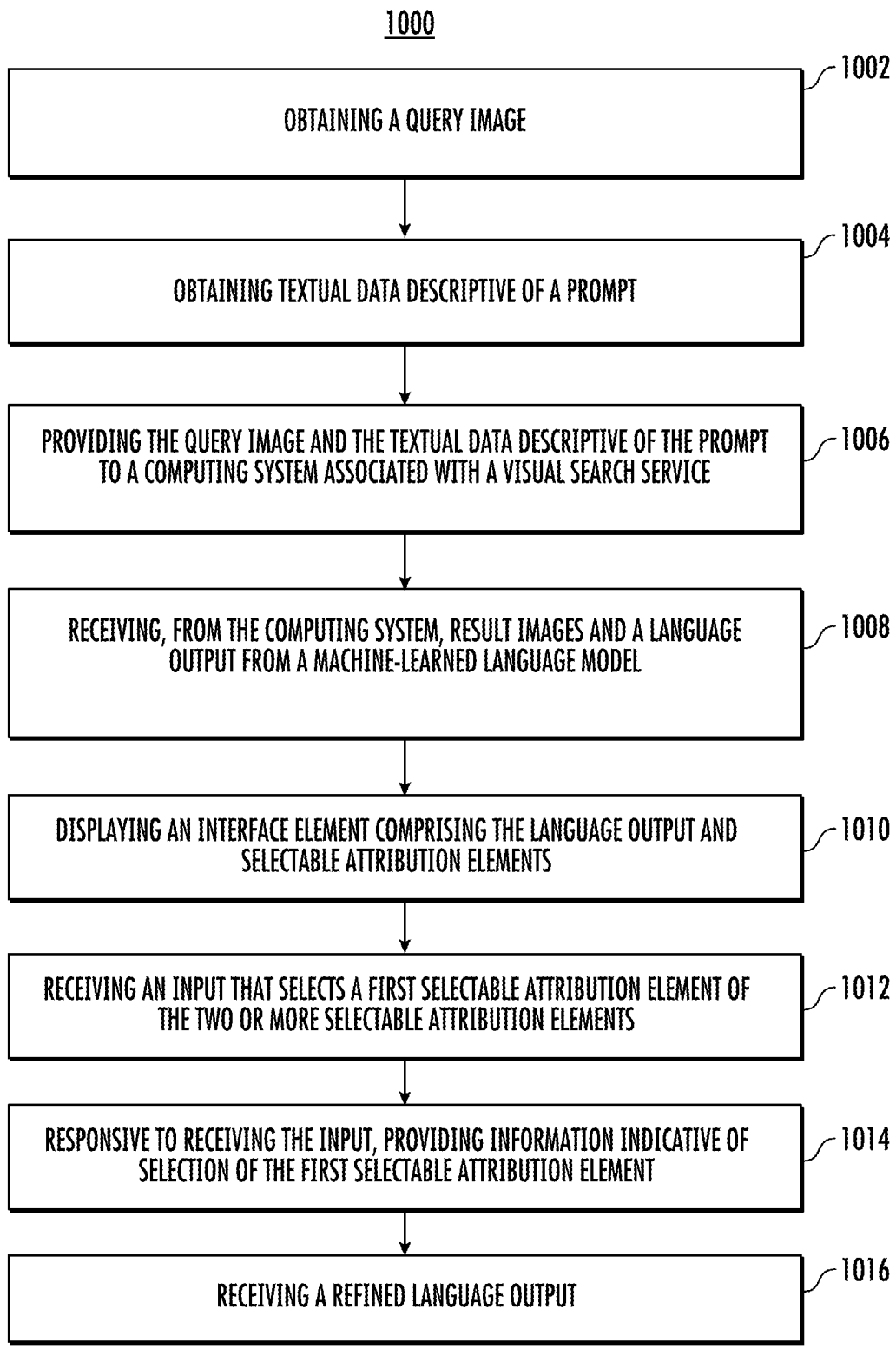
FIG. 10 depicts a flow chart diagram of an example method to perform collection of user feedback for refinement of visual search information according to some implementations of the present disclosure.

FIG. 10 depicts a flow chart diagram of an example method 1000 to perform collection of user feedback for refinement of visual search information according to example embodiments of the present disclosure. Although FIG. 10 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 1002, a user computing device can obtain a query image. In some implementations, obtaining the query image includes obtaining an input indicative of a request to capture an image using an image capture device associated with the user computing device. The user computing device, responsive to obtaining the input, can capture the query image using the image capture device associated with the user computing device.

At 1004, the user computing device can obtain textual data descriptive of a prompt. In some implementations, obtaining the textual data descriptive of the prompt can include obtaining a spoken utterance from the user via an audio capture device associated with the user computing device. The user computing device can determine the textual data descriptive of the prompt based at least in part on the spoken utterance. For example, the user computing device can process the spoken utterance with a machine-learned speech recognition model to obtain the textual data.

At 1006, the user computing device can provide the query image and the textual data descriptive of the prompt to a computing system. For example, the computing system can be a system associated with a visual search service, such as a multimodal search service that provides information in response to a multimodal query that includes an image and an associated prompt.

At 1008, the user computing device can, responsive to providing the query image and the prompt, receive, from the computing system, (a) two or more result images, and (b) a language output from a machine-learned language model. The language output is generated based on the prompt and textual content from source documents that include the two or more result images.

At 1010, the user computing device can display, within an interface of an application executed by the user computing device, (a) an interface element comprising the language output, and (b) two or more selectable attribution elements respectively associated with the two or more result images. Each selectable attribution element includes a thumbnail of the associated result image and attribution information that identifies source documents that include the associated result image.

At 1012, the user computing device can receive, from a user via an input device associated with the user computing device, an input that selects a first selectable attribution element of the two or more selectable attribution elements.

In some implementations, each selectable attribution element can include a first selectable portion and a second selectable portion. The user computing device receives, from the user via an input device associated with the user computing device, an input that selects the first selectable portion of a first selectable attribution element of the two or more selectable attribution elements. Responsive to receiving the input to the first selectable portion of the first selectable attribution element, the user computing device can provide, to the computing system, the information indicative of selection of the first selectable attribution element.

Alternatively, in some implementations, the user computing device can receive, from the user via the input device associated with the user computing device, an input that selects the second selectable portion of the first selectable attribution element of the two or more selectable attribution elements. Responsive to receiving the input that selects the second selectable portion of the first selectable attribution element, the user computing device can cause display of the source document identified by the attribution information included in the first selectable attribution element. For example, if the source document is a website, the user computing device can execute a web browser application and navigate to the website. For another example, if the source document is a PDF, the user computing device can execute a PDF reader application and open the PDF.

At 1014, the user computing device can, responsive to receiving the input, provide, to the computing system, information indicative of selection of the first selectable attribution element.

At 1016, the user computing device can, responsive to providing the information, receive, from the computing system, a refined language output. The refined language output can be generated based on the prompt and textual content from source documents that include the two or more result images other than a first result image associated with the first selectable.

Figure 11A:
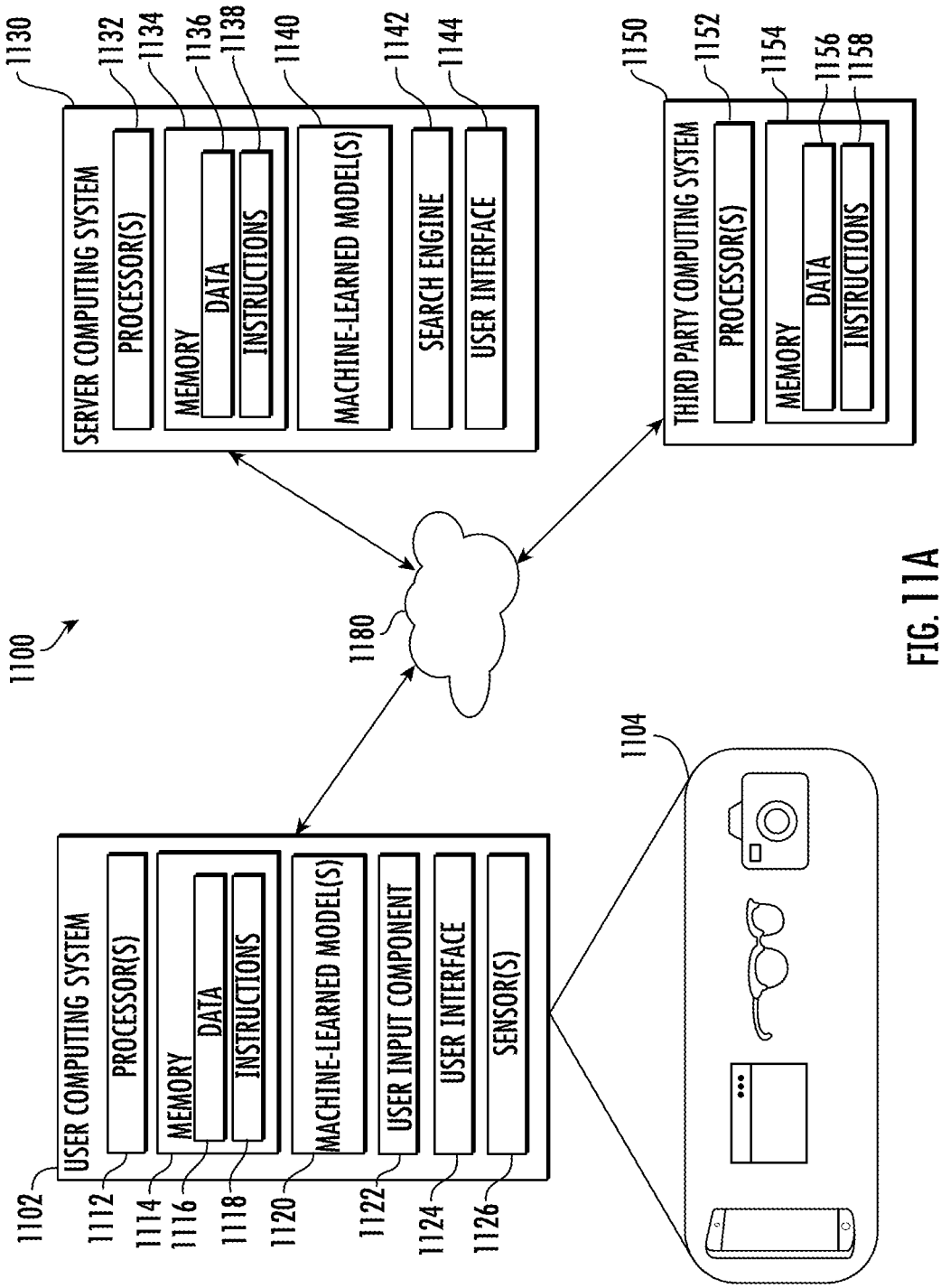
FIG. 11A depicts a block diagram of an example computing system that performs visual or multimodal search services according to some implementations of the present disclosure.

FIG. 11A depicts a block diagram of an example computing system 100 that performs visual or multimodal search services according to example embodiments of the present disclosure. The system 1100 includes a user computing system 1102, a server computing system 1130, and/or a third computing system 1150 that are communicatively coupled over a network 1180.

The user computing system 1102 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 1102 includes one or more processors 1112 and a memory 1114. The one or more processors 1112 can be any suitable processing device (e.g., a processor core, a microprocessor, an ASIC, a FPGA, a controller, a microcontroller, etc.) and can be one processor or a plurality of processors that are operatively connected. The memory 1114 can include one or more non-transitory computer-readable storage mediums, such as RAM, ROM, EEPROM, EPROM, flash memory devices, magnetic disks, etc., and combinations thereof. The memory 1114 can store data 1116 and instructions 1118 which are executed by the processor 1112 to cause the user computing system 1102 to perform operations.

In some implementations, the user computing system 1102 can store or include one or more machine-learned models 1120. For example, the machine-learned models 1120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 1120 can be received from the server computing system 1130 over network 1180, stored in the user computing device memory 1114, and then used or otherwise implemented by the one or more processors 1112. In some implementations, the user computing system 1102 can implement multiple parallel instances of a single machine-learned model 1120 (e.g., to perform parallel machine-learned model processing across multiple instances of input data and/or detected features).

More particularly, the one or more machine-learned models 1120 may include one or more detection models, one or more classification models, one or more segmentation models, one or more augmentation models, one or more generative models, one or more natural language processing models, one or more optical character recognition models, and/or one or more other machine-learned models. The one or more machine-learned models 1120 can include one or more transformer models. The one or more machine-learned models 1120 may include one or more neural radiance field models, one or more diffusion models, and/or one or more autoregressive language models.

The one or more machine-learned models 1120 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 1120 can process image data, text data, audio data, and/or latent encoding data to generate output data that can include image data, text data, audio data, and/or latent encoding data. The one or more machine-learned models 1120 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Additionally or alternatively, one or more machine-learned models 1140 can be included in or otherwise stored and implemented by the server computing system 1130 that communicates with the user computing system 1102 according to a client-server relationship. For example, the machine-learned models 1140 can be implemented by the server computing system 1130 as a portion of a web service (e.g., a viewfinder service, a visual search service, an image processing service, an ambient computing service, and/or an overlay application service). Thus, one or more models 1120 can be stored and implemented at the user computing system 1102 and/or one or more models 1140 can be stored and implemented at the server computing system 1130.

The user computing system 1102 can also include one or more user input component 1122 that receives user input. For example, the user input component 1122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system can store and/or provide one or more user interfaces, which may be associated with one or more applications. The one or more user interfaces can be configured to receive inputs and/or provide data for display (e.g., image data, text data, audio data, one or more user interface elements, an augmented-reality experience, a virtual reality experience, and/or other data for display. The user interfaces may be associated with one or more other computing systems (e.g., server computing system 130 and/or third party computing system 150). The user interfaces can include a viewfinder interface, a search interface, a generative model interface, a social media interface, a media content gallery interface, etc.

The user computing device 1102 may include and/or receive data from one or more sensors 1126. The one or more sensors 1126 may be housed in a housing component that houses the one or more processors 1112, the memory 1114, and/or one or more hardware components, which may store, and/or cause to perform, one or more software packets. The one or more sensors 1126 can include one or more image sensors (e.g., a camera), one or more LIDAR sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 1102 may include, and/or be part of, a user computing device 1104. The user computing device 1104 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more one or more user computing devices 1104. For example, a camera of a smartphone may be utilized to capture image data descriptive of the environment, and/or an overlay application of the user computing device 1104 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 1130 includes one or more processors 1132 and a memory 1134. The one or more processors 1132 can be any suitable processing device (e.g., a processor core, a microprocessor, an ASIC, a FPGA, a controller, a microcontroller, etc.) and can be one processor or a plurality of processors that are operatively connected. The memory 1134 can include one or more non-transitory computer-readable storage mediums, such as RAM, ROM, EEPROM, EPROM, flash memory devices, magnetic disks, etc., and combinations thereof. The memory 1134 can store data 1136 and instructions 1138 which are executed by the processor 1132 to cause the server computing system 1130 to perform operations.

In some implementations, the server computing system 1130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 1130 can store or otherwise include one or more machine-learned models 1140. For example, the models 1140 can be or can otherwise include various machine-learned models. Example machine-learned models include neural networks or other multi-layer non-linear models. Example neural networks include feed forward neural networks, deep neural networks, recurrent neural networks, and convolutional neural networks.

Additionally and/or alternatively, the server computing system 1130 can include and/or be communicatively connected with a search engine 1142 that may be utilized to crawl one or more databases (and/or resources). The search engine 1142 can process data from the user computing system 1102, the server computing system 1130, and/or the third party computing system 150 to determine one or more search results associated with the input data. The search engine 142 may perform term based search, label based search, Boolean based searches, image search, embedding based search (e.g., nearest neighbor search), multimodal search, and/or one or more other search techniques.

The server computing system 1130 may store and/or provide one or more user interfaces 1144 for obtaining input data and/or providing output data to one or more users. The one or more user interfaces 1144 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 1102 and/or the server computing system 1130 can train the models 1120 and/or 1140 via interaction with the third party computing system 1150 that is communicatively coupled over the network 1180. The third party computing system 1150 can be separate from the server computing system 1130 or can be a portion of the server computing system 1130. Alternatively and/or additionally, the third party computing system 1150 may be associated with one or more web resources, one or more web platforms, one or more other users, and/or one or more contexts.

The third party computing system 1150 can include one or more processors 1152 and a memory 154. The one or more processors 1152 can be any suitable processing device (e.g., a processor core, a microprocessor, an ASIC, a FPGA, a controller, a microcontroller, etc.) and can be one processor or a plurality of processors that are operatively connected. The memory 1154 can include one or more non-transitory computer-readable storage mediums, such as RAM, ROM, EEPROM, EPROM, flash memory devices, magnetic disks, etc., and combinations thereof. The memory 1154 can store data 1156 and instructions 1158 which are executed by the processor 1152 to cause the third party computing system 1150 to perform operations. In some implementations, the third party computing system 1150 includes or is otherwise implemented by one or more server computing devices.

The network 1180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

The user computing system 1102 may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 1100.

The central intelligence layer can communicate with a central device data layer. The central device data layer can be a centralized repository of data for the computing system 1100. The central device data layer may communicate with a number of other components of the computing device, such as, for example, one or more sensors, a context manager, a device state component, and/or additional components. In some implementations, the central device data layer can communicate with each device component using an API (e.g., a private API).

FIG. 11B depicts a block diagram of an example computing system 1250 that performs visual search operations, and/or refinement of visual search information according to example embodiments of the present disclosure. In particular, the example computing system 1250 can include one or more computing devices 1252 that can be utilized to obtain, and/or generate, one or more datasets that can be processed by a sensor processing system 1260 and/or an output determination system 1280 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 1252 (e.g., one or more sensors in the computing device 1252). Additionally and/or alternatively, the one or more datasets can be stored data and/or retrieved data (e.g., data retrieved from a web resource). For example, images, text, and/or other content items may be interacted with by a user. The interacted with content items can then be utilized to generate one or more determinations.

The one or more computing devices 1252 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 1260. The sensor processing system 1260 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 1262, which may determine a context associated with one or more content items. The context determination block 1262 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 1260 may include an image preprocessing block 1264. The image preprocessing block 1264 may be utilized to adjust one or more values of an obtained and/or received image to prepare the image to be processed by one or more machine-learned models and/or one or more search engines 1274. The image preprocessing block 6124 may resize the image, adjust saturation values, adjust resolution, strip and/or add metadata, and/or perform one or more other operations.

In some implementations, the sensor processing system 1260 can include one or more machine-learned models, which may include a detection model 1266, a segmentation model 1268, a classification model 1270, an embedding model 1272, and/or one or more other machine-learned models. For example, the sensor processing system 1260 may include one or more detection models 66 that can be utilized to detect particular features in the processed dataset. In particular, one or more images can be processed with the one or more detection models 1266 to generate one or more bounding boxes associated with detected features in the one or more images.

Additionally and/or alternatively, one or more segmentation models 1268 can be utilized to segment one or more portions of the dataset from the one or more datasets. For example, the one or more segmentation models 1268 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 1270 can be utilized to process image data, text data, audio data, latent encoding data, multimodal data, and/or other data to generate one or more classifications. The one or more classification models 1270 can include one or more image classification models, one or more object classification models, one or more text classification models, one or more audio classification models, and/or one or more other classification models. The one or more classification models 1270 can process data to determine one or more classifications.

In some implementations, data may be processed with one or more embedding models 1272 to generate one or more embeddings. For example, one or more images can be processed with the one or more embedding models 1272 to generate one or more image embeddings in an embedding space. The one or more image embeddings may be associated with one or more image features of the one or more images. In some implementations, the one or more embedding models 1272 may be configured to process multimodal data to generate multimodal embeddings. The one or more embeddings can be utilized for classification, search, and/or learning embedding space distributions.

The sensor processing system 1260 may include one or more search engines 1274 that can be utilized to perform one or more searches. The one or more search engines 1274 may crawl one or more databases (e.g., one or more local databases, one or more global databases, one or more private databases, one or more public databases, one or more specialized databases, and/or one or more general databases) to determine one or more search results. The one or more search engines 1274 may perform feature matching, text based search, embedding based search (e.g., k-nearest neighbor search), metadata based search, multimodal search, web resource search, image search, text search, and/or application search.

Additionally and/or alternatively, the sensor processing system 1260 may include one or more multimodal processing blocks 1276, which can be utilized to aid in the processing of multimodal data. The one or more multimodal processing blocks 1276 may include generating a multimodal query and/or a multimodal embedding to be processed by one or more machine-learned models and/or one or more search engines 1274.

The output(s) of the sensor processing system 1260 can then be processed with an output determination system 1280 to determine one or more outputs to provide to a user. The output determination system 1280 may include heuristic based determinations, machine-learned model based determinations, user selection based determinations, and/or context based determinations.

The output determination system 1280 may determine how and/or where to provide the one or more search results in a search results interface 1282. Additionally and/or alternatively, the output determination system 1280 may determine how and/or where to provide the one or more machine-learned model outputs in a machine-learned model output interface 1284. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 1260 may be utilized to generate and/or provide an augmented-reality experience and/or a virtual-reality experience 1286. For example, the one or more obtained datasets may be processed to generate one or more augmented-reality rendering assets and/or one or more virtual-reality rendering assets, which can then be utilized to provide an augmented-reality experience and/or a virtual-reality experience 1286 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 1288 may be determined based on the output(s) of the sensor processing system 1260. For example, a search prompt, a purchase prompt, a generate prompt, a reservation prompt, a call prompt, a redirect prompt, and/or one or more other prompts may be determined to be associated with the output(s) of the sensor processing system 1260. The one or more action prompts 1288 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 1260 may be processed with one or more generative models 1290 to generate a model-generated content item that can then be provided to a user. The generation may be prompted based on a user selection and/or may be automatically performed (e.g., automatically performed based on one or more conditions, which may be associated with a threshold amount of search results not being identified).

The output determination system 1280 may process the one or more datasets and/or the output(s) of the sensor processing system 1260 with a data augmentation block 1292 to generate augmented data. For example, one or more images can be processed with the data augmentation block 1292 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 60 may be stored based on a data storage block 1294 determination.

The output(s) of the output determination system 1280 can then be provided to a user via one or more output components of the user computing device 1252. For example, one or more user interface elements associated with the one or more outputs can be provided for display via a visual display of the user computing device 1252.

The processes may be performed iteratively and/or continuously. One or more user inputs to the provided user interface elements may condition and/or affect successive processing loops.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Embodiments

Described henceforth are some embodiments of the present disclosure. However, it should be noted that the following embodiments are not a comprehensive listing of all embodiments of the present disclosure. Rather, the following embodiments are provided to exemplify various scenarios in which embodiments of the present disclosure may be utilized.

Embodiment 1: A computer-implemented method, comprising:
  retrieving, by a computing system comprising one or more processor devices, a result image based on a similarity between a query image and the result image;
  obtaining, by the computing system, a first unit of text, wherein the first unit of text comprises at least a portion of textual content of a source document that includes the result image;
  determining, by the computing system, a second unit of text responsive to a prompt associated with the query image, wherein the second unit of text comprises one or more of:
    (a) at least some of the first unit of text; or
    (b) text derived from the first unit of text; and
  providing, by the computing system, the second unit of text and the result image for display within an interface.

Embodiment 2: The method of embodiment 1, wherein retrieving the result image comprises processing, by the computing system, the query image with a machine-learned visual search model to obtain an intermediate representation of the query image; and retrieving, by the computing system, the result image based on a degree of similarity between the intermediate representation of the query image and an intermediate representation of the result image.

Embodiment 3: The computer-implemented method of embodiment 2, wherein processing the query image with the machine-learned visual search model comprises processing, by the computing system, the query image with a machine-learned embedding model to obtain a query image embedding for the query image, and wherein retrieving the result image comprises retrieving, by the computing system, the result image based on a distance between the query image embedding and an embedding of the result image within an embedding space.

Embodiment 4: The computer-implemented method of embodiment 1, wherein, prior to processing the query image, the method comprises obtaining, by the computing system, the query image from a user computing device.

Embodiment 5: The computer-implemented method of embodiment 4, wherein the interface comprises a user interface of an application executed by the user computing device.

Embodiment 6: The computer-implemented method of embodiment 4, wherein obtaining the query image comprises obtaining, by the computing system, the query image and the prompt associated with the query image from the user computing device.

Embodiment 7: The computer-implemented method of embodiment 4, wherein retrieving the result image further comprises providing, by the computing system for display within the interface, the result image to the user computing device, and responsive to providing the result image, receiving, from the user computing device, the prompt associated with the query image.

Embodiment 8: The computer-implemented method of embodiment 1, wherein determining the second unit of text responsive to the prompt associated with the query image comprises processing, by the computing system, the second unit of text and the prompt associated with the query image with a machine-learned language model to obtain a language output that comprises the second unit of text.

Embodiment 9: The computer-implemented method of embodiment 8, wherein the second unit of text comprises a subset of the first unit of text.

Embodiment 10: The computer-implemented method of embodiment 8, wherein the second unit of text comprises text derived from the first unit of text, and wherein the text derived from the first unit of text is descriptive of a summarization of the first unit of text.

Embodiment 11: The computer-implemented method of embodiment 1, wherein the source document comprises:
one or more web pages of a web site;
an article;
a newspaper;
a book; or
a transcript.

Embodiment 12: The computer-implemented method of embodiment 1, wherein providing the second unit of text and the result image further comprises providing, by the computing system for display within the interface, attribution information that (a) identifies the source document and/or (b) indicates a location from which the source document is accessible.

Embodiment 13: The computer-implemented method of embodiment 12, wherein the source document comprises a web page, and wherein the attribution information comprises an address for the web page.

Embodiment 14: The computer-implemented method of embodiment 12, wherein the source document comprises a magazine, and wherein the attribution information comprises a citation indicative of a location of the result image within the magazine.

Embodiment 15: The computer-implemented method of embodiment 1, wherein, prior to determining the second unit of text, the method comprises generating, by the computing system, the prompt associated with the query image based at least in part on the query image.

Embodiment 16: The computer-implemented method of embodiment 15, wherein generating the prompt associated with the query image comprises processing, by the computing system, the query image with a machine-learned model to generate a semantic output descriptive of the image, and generating, by the computing system, the prompt based at least in part on the semantic output.

Embodiment 17: A computing system, comprising:
one or more processors;
one or more non-transitory computer-readable media that collectively store a first set of instructions that, when executed by the one or more processors, cause the computing system to perform operations, the operations comprising:
obtaining a query image and an associated prompt from a user computing device;
processing the query image with a machine-learned embedding model to obtain a query image embedding;
retrieving a result image based on a similarity between the query image embedding and an embedding of the result image;
identifying a source document for the result image, wherein the source document comprises the result image and textual content associated with the result image;
determining a first unit of text comprising at least a portion of the textual content associated with the result image from the source document;
processing the first unit of text and the prompt with a machine-learned language model to obtain a language output comprising a second unit of text, wherein the second unit of text comprises one or more of:
(a) at least some of the first unit of text; or
(b) text derived from the first unit of text; and
providing the second unit of text and the result image for display within an interface of an application executed by the user computing device.

Embodiment 18: The computing system of embodiment 17, wherein the operations further comprise:
receiving information indicative of a request for additional information from the user computing device;
retrieving a second result image based on a similarity between the query image embedding and an embedding of the second result image;
identifying a first source document and a second source document for the result image, wherein each of the first source document and the second source document comprise the result image and textual content associated with the result image, and wherein the textual content associated with the result image of the first source document is different than the textual content associated with the result image of the second source document;
determining an additional first unit of text comprising at least a portion of the textual content associated with the result image from one or more of first source document or the second source document;
processing the additional first unit of text and the prompt with the machine-learned language model to obtain a second language output comprising an additional second unit of text, wherein the additional second unit of text comprises one or more of:
(a) at least some of the additional first unit of text; or
(b) text derived from the additional first unit of text; and
providing the additional second unit of text and the second result image for display within the interface of the application executed by the user computing device.

Embodiment 19: The computing system of embodiment 17, wherein providing the second unit of text and the result image further comprises providing attribution information that identifies the source document for display within the interface of the application executed by the user computing device.

Embodiment 20: One or more non-transitory computer-readable media that collectively store a first set of instructions that, when executed by one or more processors, cause the one or more processors to perform operations, the operations comprising:
retrieving a result image based on a similarity between a query image and the result image;
obtaining a first unit of text, wherein the first unit of text comprises at least a portion of textual content of a source document that includes the result image;
determining a second unit of text responsive to a prompt associated with the query image, wherein the second unit of text comprises one or more of:
  (a) at least some of the first unit of text; or
  (b) text derived from the first unit of text; and
providing the second unit of text and the result image for display within an interface.

Embodiment 21: A computing system, comprising:
one or more processors;
one or more non-transitory computer-readable media that collectively store a first set of instructions that, when executed by the one or more processors, cause the computing system to perform operations, the operations comprising:
retrieving a plurality of result images based on a similarity between an intermediate representation of a query image and each of a plurality of intermediate representations respectively associated with the plurality of result images;
identifying a plurality of source documents, wherein each of the plurality of source documents comprises a result image of the plurality of result images and textual content associated with the result image;
respectively determining a plurality of first units of text for the plurality of result images, wherein each first unit of text comprises at least a portion of the textual content associated with the result image from one or more source documents that include the result image;
processing a set of textual inputs with a machine-learned language model to obtain a language output comprising a second unit of text, wherein the set of textual inputs comprises:
  (a) two or more first units of text respectively associated with two or more result images of the plurality of result images; and
  (b) a prompt associated with the query image; and
providing the second unit of text and the two or more result images to a user computing device for display within an interface of the user computing device.

Embodiment 22: The computing system of embodiment 21, wherein retrieving the plurality of result images comprises processing the query image with a machine-learned visual search model to obtain the intermediate representation of the query image; and retrieving the result image based on a degree of similarity between the intermediate representation of the query image and intermediate representations of the plurality of result images.

Embodiment 23: The computing system of embodiment 22, wherein processing the query image with the machine-learned visual search model comprises processing the query image with a machine-learned embedding model to obtain a query image embedding for the query image; and wherein retrieving the plurality of result images comprises retrieving the plurality of result images based on a distance between the query image embedding and embeddings of the plurality of result images within an embedding space.

Embodiment 24: The computing system of embodiment 21, wherein, prior to processing the query image, the operations comprise obtaining the query image from the user computing device.

Embodiment 25: The computing system of embodiment 21, wherein obtaining the query image comprises obtaining the query image and the prompt associated with the query image from the user computing device.

Embodiment 26: The computing system of embodiment 21, wherein identifying the plurality of source documents further comprises obtaining attribution information, wherein, for each of the plurality of source documents, the attribution information comprises (a) identifying information that identifies the source document, and/or (b) information descriptive of a location from which the source document can be accessed.

Embodiment 27: The computing system of embodiment 26, wherein providing the second unit of text and the two or more result images to the user computing device for display within the interface of the user computing device comprises: providing interface data to the user computing device, wherein the interface data comprises instructions to generate (a) an interface element comprising the second unit of text; and (b) two or more selectable attribution elements respectively associated with the two or more result images, wherein each selectable attribution element comprises a thumbnail of the associated result image and the attribution information for the one or more source documents that include the associated result image.

Embodiment 28: The computing system of embodiment 27, wherein the operations further comprise:
receiving, from the user computing device, data indicative of selection of a first selectable attribution element of the two or more selectable attribution elements by a user of the user computing device, wherein the first selectable attribution element is associated with a first result image of the two or more result images;
identifying a first unit of text of the two or more first units of text that includes at least a portion of textual content from the source document that includes the first result image;
removing the first unit of text from the set of textual inputs to obtain a second set of textual inputs;
processing the second set of textual inputs with the machine-learned language model to obtain a second language output comprising a refined second unit of text; and
providing the refined second unit of text to the user computing device.

Embodiment 29: The computing system of embodiment 28, wherein removing the first unit of text from the set of textual inputs to obtain the second set of textual inputs further comprises removing information associated with the source document that includes the first result image from the attribution information to obtain refined attribution information; and wherein providing the refined second unit of text to the user computing device further comprises providing the refined attribution information to the user computing device.

Embodiment 30: The computing system of embodiment 27, wherein the language output further comprises predictive information that predicts a portion of the second unit of text as being most relevant to the prompt; and wherein the interface data further comprises instructions to generate an emphasis element that highlights the portion of the second unit of text.

Embodiment 31: The computing system of embodiment 26, wherein providing the second unit of text and the two or more result images to the user computing device for display within the interface of the user computing device comprises providing interface data to the user computing device, wherein the interface data comprises instructions to generate:
- a first interface element comprising a first portion of the second unit of text, wherein the first portion of the second unit of text is associated with a first result image of the two or more result images;
- a second interface element comprising a second portion of the second unit of text, wherein the second portion of the second unit of text is associated with a second result image of the two or more result images; and
- a first selectable attribution element and a second selectable attribution element, wherein the first selectable attribution element comprises a thumbnail of the first result image and the attribution information for the source document that includes the first result image, and wherein the second selectable attribution element comprises a thumbnail of the second result image and the attribution information for the source document that includes the second result image.

Embodiment 32: The computing system of embodiment 21, wherein the second unit of text comprises a summarization of the two or more first units of text.

Embodiment 33: A computer-implemented method, comprising:
- retrieving, by a computing system comprising one or more computing devices, a plurality of result images based on a similarity between an intermediate representation of a query image and each of a plurality of intermediate representations respectively associated with the plurality of result images;
- identifying, by the computing system, a plurality of source documents, wherein each of the plurality of source documents comprises a result image of the plurality of result images and textual content associated with the result image;
- respectively determining, by the computing system, a plurality of first units of text for the plurality of result images, wherein each first unit of text comprises at least a portion of the textual content associated with the result image from one or more source documents that include the result image;
- processing, by the computing system, a set of textual inputs with a machine-learned language model to obtain a language output comprising a second unit of text, wherein the set of textual inputs comprises:
  (a) two or more first units of text respectively associated with two or more result images of the plurality of result images; and
  (b) a prompt associated with the query image; and
- providing, by the computing system, the second unit of text and the two or more result images to a user computing device for display within an interface of the user computing device.

Embodiment 34: The computer-implemented method of embodiment 33, wherein retrieving the plurality of result images comprises processing, by the computing system, the query image with a machine-learned visual search model to obtain the intermediate representation of the query image; and retrieving, by the computing system, the result image based on a degree of similarity between the intermediate representation of the query image and intermediate representations of the plurality of result images.

Embodiment 35: The computer-implemented method of embodiment 34, wherein processing the query image with the machine-learned visual search model comprises processing, by the computing system, the query image with a machine-learned embedding model to obtain a query image embedding for the query image; and wherein retrieving the plurality of result images comprises retrieving, by the computing system, the plurality of result images based on a distance between the query image embedding and embeddings of the plurality of result images within an embedding space.

Embodiment 36: The computer-implemented method of embodiment 33, wherein, prior to processing the query image, the method comprises obtaining, by the computing system, the query image from the user computing device.

Embodiment 37: The computer-implemented method of embodiment 33, wherein obtaining the query image comprises obtaining, by the computing system, the query image and the prompt associated with the query image from the user computing device.

Embodiment 38: The computer-implemented method of embodiment 33, wherein identifying the plurality of source documents further comprises obtaining, by the computing system, attribution information, wherein, for each of the plurality of source documents, the attribution information comprises (a) identifying information that identifies the source document, and/or (b) information descriptive of a location from which the source document can be accessed.

Embodiment 39: The computer-implemented method of embodiment 38, wherein providing the second unit of text and the two or more result images to the user computing device for display within the interface of the user computing device comprises providing, by the computing system, interface data to the user computing device, wherein the interface data comprises instructions to generate (a) an interface element comprising the second unit of text; and (b) two or more selectable attribution elements respectively associated with the two or more result images, wherein each attribution element comprises a thumbnail of the associated result image and the attribution information for the one or more source documents that include the associated result image.

Embodiment 40: One or more non-transitory computer-readable media that collectively store a first set of instructions that, when executed by one or more processors, cause the one or more processors to perform operations, the operations comprising:
- obtaining a query image and an associated prompt from a user computing device;
- processing the query image with a machine-learned embedding model to obtain a query image embedding;
- retrieving a result image based on a similarity between the query image embedding and an embedding of the result image;
- identifying a source document for the result image, wherein the source document comprises the result image and textual content associated with the result image;
- determining a first unit of text comprising at least a portion of the textual content associated with the result image from the source document;
- processing the first unit of text and the prompt with a machine-learned language model to obtain a language output comprising a second unit of text, wherein the second unit of text comprises one or more of:

(a) at least some of the first unit of text; or
(b) text derived from the first unit of text; and
providing the second unit of text and the result image for display within an interface of an application executed by the user computing device.

Embodiment 41: A computer-implemented method, comprising:
retrieving, by a computing system comprising one or more computing devices, two or more result images based on a similarity between an intermediate representation of a query image and intermediate representations of the two or more result images;
processing, by the computing system, a set of textual inputs with a machine-learned language model to obtain a language output comprising textual content, wherein the set of textual inputs comprises textual content from source documents that include the two or more result images, and a prompt associated with the query image;
providing, by the computing system, the language output and the two or more result images to a user computing device for display within an interface of the user computing device;
receiving, by the computing system from the user computing device, information descriptive of an indication by a user of the user computing device that a first result image of the two or more result images is visually dissimilar to the query image;
removing, by the computing system, textual content associated with the source document that includes the first result image from the set of textual inputs;
processing, by the computing system, the set of textual inputs with the machine-learned language model to obtain a refined language output; and
providing, by the computing system, the refined language output to the user computing device for display within the interface of the user computing device.

Embodiment 42: The computer-implemented method of embodiment 41, wherein retrieving the two or more result images comprises processing, by the computing system, the query image with a machine-learned visual search model to obtain the intermediate representation of the query image; and retrieving, by the computing system, the result image based on a degree of similarity between the intermediate representation of the query image and intermediate representations of the two or more result images.

Embodiment 43: The computer-implemented method of embodiment 42, wherein prior to processing the query image, the method comprises obtaining, by the computing system, the query image from the user computing device.

Embodiment 44: The computer-implemented method of embodiment 41, wherein processing the set of textual inputs with the machine-learned language model further comprises obtaining attribution information, wherein, for each of the source documents, the attribution information comprises (a) identifying information that identifies the source document, and/or (b) information descriptive of a location from which the source document can be accessed.

Embodiment 45: The computer-implemented method of embodiment 44, wherein providing the language output and the two or more result images further comprises providing, by the computing system, the attribution information to the user computing device for display within the interface of the user computing device.

Embodiment 46: The computer-implemented method of embodiment 44, providing the language output and the two or more result images to the user computing device for display within the interface of the user computing device comprises providing interface data to the user computing device, wherein the interface data comprises instructions to generate (a) an interface element comprising the language output; and (b) two or more selectable attribution elements respectively associated with the two or more result images, wherein each attribution element comprises a thumbnail of the associated result image and the attribution information for one or more source documents that include the associated result image.

Embodiment 47: The computer-implemented method of embodiment 46, wherein receiving the information descriptive of the indication by the user of the user computing device that the first result image of the two or more result images is visually dissimilar to the query image comprises receiving, from the user computing device, data indicative of selection of a first selectable attribution element of the two or more selectable attribution elements by the user of the user computing device, wherein the first selectable attribution element is associated with the first result image of the two or more result images.

Embodiment 48: The computer-implemented method of embodiment 47, wherein removing the textual content associated with the source document that includes the first result image from the set of textual inputs further comprises removing information associated with the source document that includes the first result image from the attribution information to obtain refined attribution information, and wherein providing the refined language output to the user computing device further comprises providing the refined attribution information to the user computing device.

Embodiment 49: The computer-implemented method of embodiment 46, wherein the language output further comprises predictive information that predicts a portion of the language output as being most relevant to the prompt, and wherein the interface data further comprises instructions to generate an emphasis element that highlights the portion of the language output.

Embodiment 50: A computer-implemented method, comprising:
obtaining, by a user computing device comprising one or more processors, a query image;
obtaining, by the user computing device, textual data descriptive of a prompt;
providing, by the user computing device, the query image and the textual data descriptive of the prompt to a computing system associated with a visual search service;
responsive to providing the query image and the prompt, receiving, by the user computing device from the computing system, (a) two or more result images, and (b) a language output from a machine-learned language model, wherein the language output is generated based on the prompt and textual content from source documents that include the two or more result images;
displaying, by the user computing device within an interface of an application executed by the user computing device:
(a) an interface element comprising the language output; and
(b) two or more selectable attribution elements respectively associated with the two or more result images, wherein each selectable attribution element comprises a thumbnail of the associated result image and attribution information that identifies a source document that includes the associated result image.

Embodiment 51: The computer-implemented method of embodiment 50, wherein each selectable attribution element comprises a first selectable portion and a second selectable portion.

Embodiment 52: The computer-implemented method of embodiment 51, wherein the method further comprises receiving, by the user computing device from a user via an input device associated with the user computing device, an input that selects the first selectable portion of a first selectable attribution element of the two or more selectable attribution elements.

Embodiment 53: The computer-implemented method of embodiment 52, wherein, responsive to receiving the input to the first selectable portion of the first selectable attribution element, providing, by the user computing device to the computing system, information indicative of selection of the first selectable attribution element, and responsive to providing the information, receiving, by the user computing device from the computing system, a refined language output, wherein the refined language output is generated based on the prompt and textual content from source documents that include the two or more result images other than a first result image associated with the first selectable attribution element.

Embodiment 54: The computer-implemented method of embodiment 53, wherein the method further comprises displaying, by the user computing device within the interface of the application executed by the user computing device, (a) an interface element comprising the refined language output; and (b) one or more selectable attribution elements, wherein the one or more selectable attribution elements comprises each of the two or more selectable attribution elements other than the first selectable attribution element.

Embodiment 55: The computer-implemented method of embodiment 52, wherein the method further comprises receiving, by the user computing device from the user via the input device associated with the user computing device, an input that selects the second selectable portion of the first selectable attribution element of the two or more selectable attribution elements; and responsive to receiving the input that selects the second selectable portion of the first selectable attribution element, causing, by the user computing device, display of the source document identified by the attribution information included in the first selectable attribution element.

Embodiment 56: The computer-implemented method of embodiment 50, wherein each of the source documents comprises:
one or more web pages of a web site;
an article;
a newspaper;
a book; or
a transcript.

Embodiment 57: The computer-implemented method of embodiment 50, wherein obtaining the textual data descriptive of the prompt comprises obtaining, by the user computing device, a spoken utterance from the user via an audio capture device associated with the user computing device; and determining, by the user computing device, the textual data descriptive of the prompt based at least in part on the spoken utterance.

Embodiment 58: The computer-implemented method of embodiment 50, wherein obtaining the query image comprises obtaining, by the user computing device, an input indicative of a request to capture an image using an image capture device associated with the user computing device; and responsive to obtaining the input, capturing, by the user computing device, the query image using the image capture device associated with the user computing device.

Embodiment 59: A user computing device, comprising:
one or more processors;
one or more non-transitory computer-readable media that collectively store a first set of instructions that, when executed by the one or more processors, cause the user computing device to perform operations, the operations comprising:
obtaining a query image;
obtaining textual data descriptive of a prompt;
providing the query image and the textual data descriptive of the prompt to a computing system associated with a visual search service;
responsive to providing the query image and the prompt, receiving, from the computing system, (a) two or more result images, and (b) a language output from a machine-learned language model, wherein the language output is generated based on the prompt and textual content from source documents that include the two or more result images;
displaying, within an interface of an application executed by the user computing device:
an interface element comprising the language output; and
two or more selectable attribution elements respectively associated with the two or more result images, wherein each selectable attribution element comprises a thumbnail of the associated result image and attribution information that identifies a source document that includes the associated result image;
receiving, from a user via an input device associated with the user computing device, an input that selects a first selectable attribution element of the two or more selectable attribution elements;
responsive to receiving the input, providing, to the computing system, information indicative of selection of the first selectable attribution element; and
responsive to providing the information, receiving, from the computing system, a refined language output, wherein the refined language output is generated based on the prompt and textual content from source documents that include the two or more result images other than a first result image associated with the first selectable attribution element.

Embodiment 60: One or more non-transitory computer-readable media that collectively store a first set of instructions that, when executed by one or more processors of a user computing device, cause the user computing device to perform operations, the operations comprising:
obtaining a query image;
obtaining textual data descriptive of a prompt;
providing the query image and the textual data descriptive of the prompt to a computing system associated with a visual search service;
responsive to providing the query image and the prompt, receiving, from the computing system, two or more result images and a language output from a machine-learned language model, wherein the language output is generated based on the prompt and textual content from source documents that include the two or more result images;

displaying, within an interface of an application executed by the user computing device:
- an interface element comprising the language output; and
- two or more selectable attribution elements respectively associated with the two or more result images, wherein each selectable attribution element comprises a thumbnail of the associated result image and attribution information that identifies a source document that includes the associated result image.

What is claimed is:

1. A computer-implemented method, comprising:
   retrieving, by a computing system comprising one or more processor devices, a result image based on a similarity between a query image and the result image;
   obtaining, by the computing system, a first unit of text, wherein the first unit of text comprises at least a portion of textual content of a source document that includes the result image;
   receiving, by the computing system, a prompt associated with the query image;
   determining, by the computing system, based on processing the first unit of text and the prompt with a machine-learned language model, a second unit of text responsive to the first unit of text and the prompt associated with the query image, wherein the second unit of text comprises
   text derived from the first unit of text;
   generating, by the computing system, based on processing the second unit of text and the result image, attribution information comprising a link associated with the result image; and
   providing, by the computing system, the attribution information comprising the link associated with the result image, the second unit of text, and the result image for display within an interface.

2. The method of claim 1, wherein retrieving the result image comprises:
   processing, by the computing system, the query image with a machine-learned visual search model to obtain an intermediate representation of the query image; and
   retrieving, by the computing system, the result image based on a degree of similarity between the intermediate representation of the query image and an intermediate representation of the result image.

3. The computer-implemented method of claim 2, wherein processing the query image with the machine-learned visual search model comprises processing, by the computing system, the query image with a machine-learned embedding model to obtain a query image embedding for the query image; and
   wherein retrieving the result image comprises retrieving, by the computing system, the result image based on a distance between the query image embedding and an embedding of the result image within an embedding space.

4. The computer-implemented method of claim 1, wherein, prior to processing the query image, the method comprises obtaining, by the computing system, the query image from a user computing device.

5. The computer-implemented method of claim 4, wherein the interface comprises a user interface of an application executed by the user computing device.

6. The computer-implemented method of claim 4, wherein obtaining the query image comprises obtaining, by the computing system, the query image and the prompt associated with the query image from the user computing device.

7. The computer-implemented method of claim 4, wherein retrieving the result image further comprises:
   providing, by the computing system for display within the interface, the result image to the user computing device; and
   responsive to providing the result image, receiving, from the user computing device, the prompt associated with the query image.

8. The computer-implemented method of claim 1, wherein the source document comprises:
   one or more web pages of a web site;
   an article;
   a newspaper;
   a book; or
   a transcript.

9. The computer-implemented method of claim 1, wherein the attribution information that (a) identifies the source document or indicates a location from which the source document is accessible.

10. The computer-implemented method of claim 9, wherein the source document comprises a web page, and wherein the attribution information comprises an address for the web page.

11. The computer-implemented method of claim 9, wherein the source document comprises a magazine, and wherein the attribution information comprises a citation indicative of a location of the result image within the magazine.

12. The computer-implemented method of claim 1, wherein, prior to determining the second unit of text, the method comprises generating, by the computing system, the prompt associated with the query image based at least in part on the query image.

13. The computer-implemented method of claim 12, wherein generating the prompt associated with the query image comprises:
   processing, by the computing system, the query image with a machine-learned model to generate a semantic output descriptive of the image; and
   generating, by the computing system, the prompt based at least in part on the semantic output.

14. The computer-implemented method of claim 1, wherein the obtaining, by the computing system, a first unit of text, wherein the first unit of text comprises at least a portion of textual content of a source document that includes the result image comprises:
   selecting, by the computing system, based on use of heuristics on the source document, the first unit of text.

15. The computer-implemented method of claim 1, wherein the obtaining, by the computing system, a first unit of text, wherein the first unit of text comprises at least a portion of textual content of a source document that includes the result image comprises:
   determining, by the computing system, a location of the result image within the source document; and
   selecting, by the computing system, one or more portions of text that precede or follow the result image.

16. The computer-implemented method of claim 1, wherein the obtaining, by the computing system, a first unit of text, wherein the first unit of text comprises at least a portion of textual content of a source document that includes the result image comprises:

obtaining, by the computing system, based on processing the source document with a machine-learned classification model, the first unit of text.

17. A computing system, comprising:
one or more processors;
one or more non-transitory computer-readable media that collectively store a first set of instructions that, when executed by the one or more processors, cause the computing system to perform operations, the operations comprising:
   obtaining a query image and an associated prompt from a user computing device;
   processing the query image with a machine-learned embedding model to obtain a query image embedding;
   retrieving a result image based on a similarity between the query image embedding and an embedding of the result image;
   identifying a source document for the result image, wherein the source document comprises the result image and textual content associated with the result image;
   determining a first unit of text comprising at least a portion of the textual content associated with the result image from the source document;
   processing the first unit of text and the prompt with a machine-learned language model to obtain a language output comprising a second unit of text, wherein the second unit of text comprises text derived from the first unit of text;
   generating, based on processing the second unit of text and the result image, attribution information comprising a link associated with the result image; and
   providing the attribution information comprising the link associated with the result image, the second unit of text, and the result image for display within an interface of an application executed by the user computing device.

18. The computing system of claim 17, wherein the operations further comprise:
   receiving information indicative of a request for additional information from the user computing device;
   retrieving a second result image based on a similarity between the query image embedding and an embedding of the second result image;
      identifying a first source document and a second source document for the result image, wherein each of the first source document and the second source document comprise the result image and textual content associated with the result image, and wherein the textual content associated with the result image of the first source document is different than the textual content associated with the result image of the second source document;
      determining an additional first unit of text comprising at least a portion of the textual content associated with the result image from one or more of first source document or the second source document;
      processing the additional first unit of text and the prompt with the machine-learned language model to obtain a second language output comprising an additional second unit of text, wherein the additional second unit of text comprises one or more of:
         (a) at least some of the additional first unit of text; or
         (b) text derived from the additional first unit of text; and
      providing the additional second unit of text and the second result image for display within the interface of the application executed by the user computing device.

19. The computing system of claim 17, wherein providing the second unit of text and the result image further comprises providing attribution information that identifies the source document for display within the interface of the application executed by the user computing device.

20. One or more non-transitory computer-readable media that collectively store a first set of instructions that, when executed by one or more processors of a computing system, cause the computing system to perform operations, the operations comprising:
   retrieving a plurality of result images based on a similarity between an intermediate representation of a query image and each of a plurality of intermediate representations respectively associated with the plurality of result images;
   identifying a plurality of source documents, wherein each of the plurality of source documents comprises a result image of the plurality of result images and textual content associated with the result image;
   respectively determining a plurality of first units of text for the plurality of result images, wherein each first unit of text comprises at least a portion of the textual content associated with the result image from one or more source documents that include the result image;
   processing a set of textual inputs with a machine-learned language model to obtain a language output comprising a second unit of text, wherein the set of textual inputs comprises:
      (a) two or more first units of text respectively associated with two or more result images of the plurality of result images; and
      (b) a prompt associated with the query image;
   generating, based on processing the second unit of text and the result image, attribution information comprising a link associated with the result image; and
   providing the attribution information comprising the link associated with the result image, the second unit of text, and the two or more result images to a user computing device for display within an interface of the user computing device.

* * * * *